(12) United States Patent
Suzuki

(10) Patent No.: US 9,456,294 B2
(45) Date of Patent: Sep. 27, 2016

(54) COMMUNICATION DEVICE

(71) Applicant: Takanobu Suzuki, Nagoya (JP)

(72) Inventor: Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 332 days.

(21) Appl. No.: 13/835,097

(22) Filed: Mar. 15, 2013

(65) Prior Publication Data

US 2013/0309968 A1 Nov. 21, 2013

(30) Foreign Application Priority Data

May 15, 2012 (JP) ................................. 2012-111749

(51) Int. Cl.
*H04W 4/00* (2009.01)

(52) U.S. Cl.
CPC .................................. *H04W 4/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0114872 | A1* | 6/2006 | Hamada | 370/338 |
| 2009/0064299 | A1* | 3/2009 | Begorre et al. | 726/7 |
| 2011/0177780 | A1 | 7/2011 | Sato et al. | |
| 2011/0188391 | A1* | 8/2011 | Sella et al. | 370/252 |
| 2011/0231902 | A1 | 9/2011 | Nagasaki et al. | |
| 2012/0102207 | A1* | 4/2012 | Salowey | H04L 41/0893 709/228 |
| 2012/0265913 | A1* | 10/2012 | Suumaki | H04W 4/008 710/303 |
| 2013/0067068 | A1* | 3/2013 | Hassan et al. | 709/224 |

FOREIGN PATENT DOCUMENTS

| | | |
|---|---|---|
| JP | 2007-166538 A | 6/2007 |
| JP | 2011-146991 A | 7/2011 |
| JP | 2011-197864 A | 10/2011 |

OTHER PUBLICATIONS

Wi-Fi Peer-to-Peer (P2P) Technical Specification Version 1.1 2010 Wi-Fi Alliance.

* cited by examiner

*Primary Examiner* — Junpeng Chen
(74) *Attorney, Agent, or Firm* — Banner & Witcoff, Ltd.

(57) ABSTRACT

A communication device may determine whether a first type of wireless network is an enterprise wireless network, in a case where the communication device currently belongs to both the first type of wireless network for executing a first type of wireless communication and a second type of wireless network for executing a second type of wireless communication. The communication device may execute a sending process comprising sending first wireless setting information to a portable terminal when it is determined that the first type of wireless network is the enterprise wireless network. The first wireless setting information may be information for the portable terminal to participate in the second type of wireless network. The communication device may execute a first particular process different from the sending process when it is determined that the first type of wireless network is not the enterprise wireless network.

12 Claims, 20 Drawing Sheets

FIG. 2

| Type of Authentication Scheme | Authentication Scheme | | Encryption Scheme | Inner Authentication Scheme |
|---|---|---|---|---|
| | Authentication Protocol | EAP Authentication Scheme | | |
| Enterprise Type | IEEE802.1X | LEAP | CKIP | — |
| | WPA-Enterprise | EAP-FAST | TKIP | NONE |
| | | | | MSCHAPv2 |
| | | | | GTC |
| | | | | TLS |
| | | PEAP | TKIP | MSCHAPv2 |
| | | | | GTC |
| | | | | TLS |
| | | EAP-TTLS | TKIP | CHAP |
| | | | | MSCHAP |
| | | | | MSCHAPv2 |
| | | | | PAP |
| | | | | TLS |
| | | EAP-TLS | TKIP | — |
| | WPA2-Enterprise | EAP-FAST | AES | NONE |
| | | | | MSCHAPv2 |
| | | | | GTC |
| | | PEAP | AES | MSCHAPv2 |
| | | | | GTC |
| | | | | TLS |
| | | EAP-TTLS | AES | CHAP |
| | | | | MSCHAP |
| | | | | MSCHAPv2 |
| | | | | PAP |
| | | EAP-TLS | AES | — |
| Personal Type | WPA-PSK | — | TKIP | |
| | | | AES | |
| | WPA2-PSK | — | TKIP | |
| | | | AES | |
| | Open | — | WEP | |
| | | — | — | |
| | Shared Key | — | WEP | |

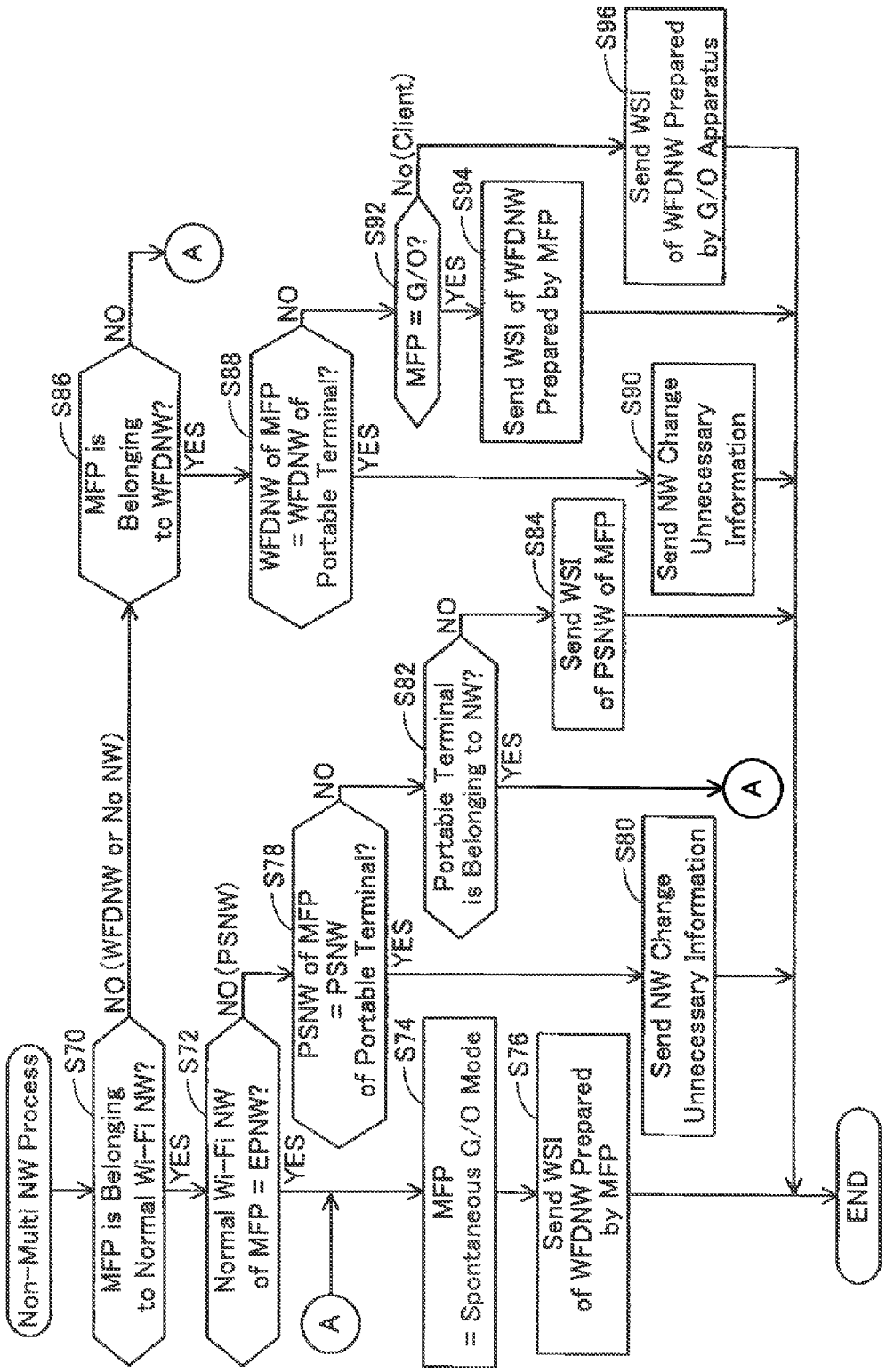

FIG. 6 (Case A) MFP is Currently Belonging to Both EPNW and WFDNW (G/O Status)

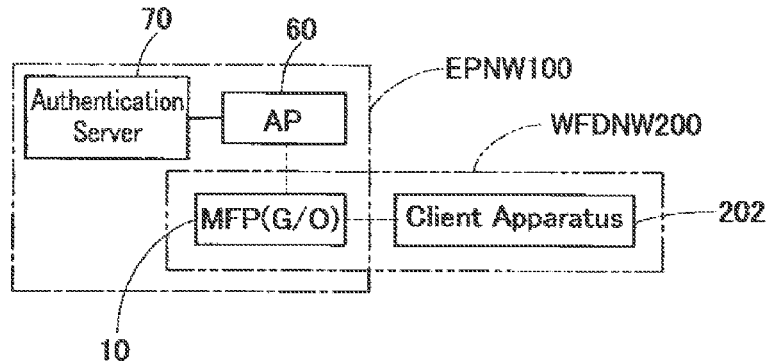

| Case | Portable Terminal | | Process of MFP |
| --- | --- | --- | --- |
| | Normal Wi-Fi | WFD | |
| A1 | × | × | Send WSI of WFDNW 200 Prepared by MFP (S38) |
| A2 | EPNW | × | Send WSI of WFDNW 200 Prepared by MFP (S38) (S38 is Performed Despite Possibility of Belonging to the Same EPNW 100) |
| A3 | PSNW | × | Send WSI of WFDNW 200 Prepared by MFP (S38) |
| A4 | × | G/O | Send WSI of WFDNW 200 Prepared by MFP (S38) |
| A5 | × | Client | (1) In Case of Portable Terminal Belonging to WFDNW 200 (ex. Client Apparatus 202 = Portable Terminal): Send NW Change Unnecessary Information (S34) (2) In Case of Portable Terminal Belonging to WFDNW Different from WFDNW 200: Send WSI of WFDNW 200 Prepared by MFP (S38) |

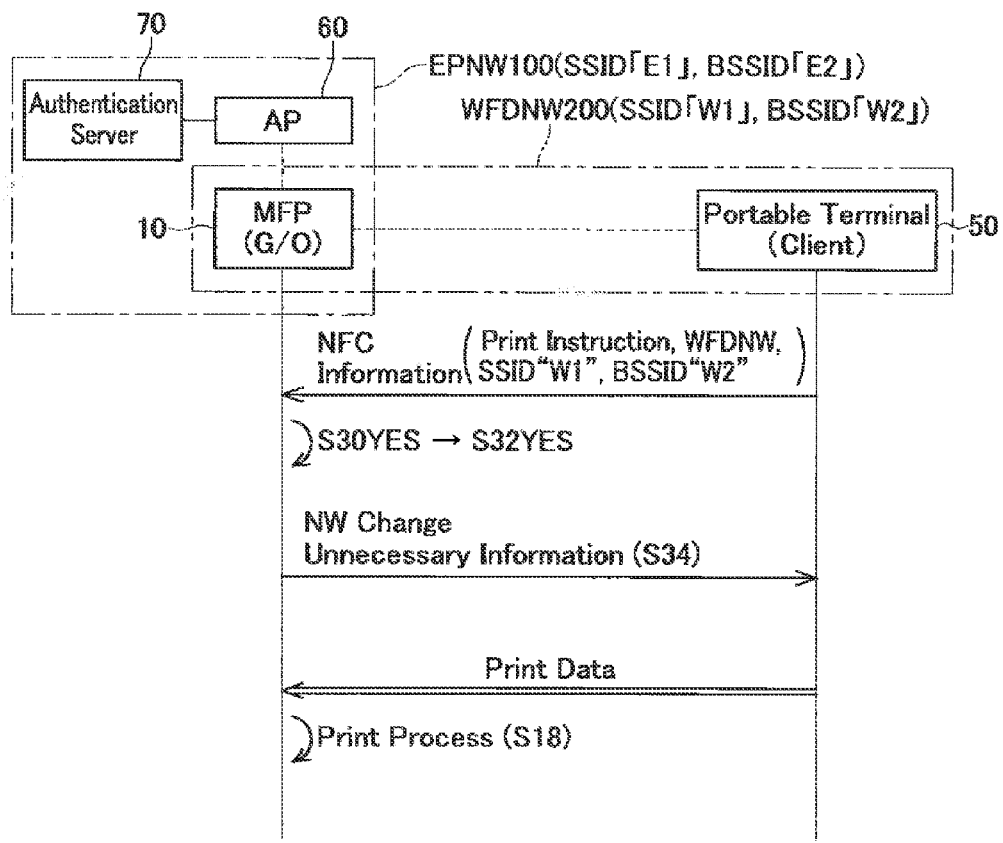

FIG. 9   MFP is Currently Belonging
(Case B)   to Both EPNW and WFDNW (Client Status)

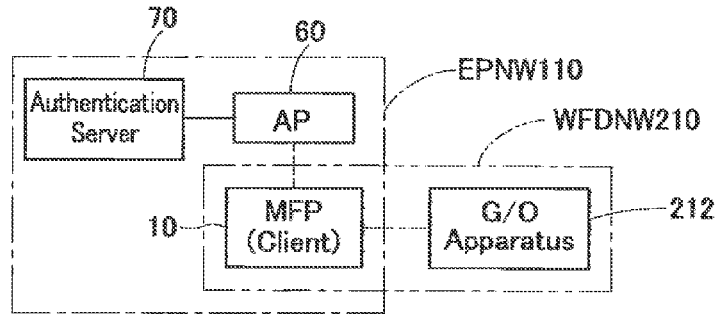

| Case | Portable Terminal | | Process of MFP |
| --- | --- | --- | --- |
| | Normal Wi-Fi | WFD | |
| B1 | × | × | Send WSI of WFDNW 210 Prepared by G/O Apparatus (S40) |
| B2 | EPNW | × | Send WSI of WFDNW 210 Prepared by G/O Apparatus (S40) (S40 is Performed Despite Possibility of Belonging to the Same EP NW 110) |
| B3 | PSNW | × | Send WSI of WFDNW 210 Prepared by G/O Apparatus (S40) |
| B4 | × | G/O | (1) In Case of Portable Terminal Belonging to WFDNW 210 (ex. G/O Apparatus 212 = Portable Terminal) : Send NW Change Unnecessary Information (S34)<br>(2) In Case of Portable Terminal Belonging to WFDNW Different from WFDNW 210 : Send WSI of WFDNW 210 Prepared by G/O Apparatus (S40) |
| B5 | × | Client | (1) In Case of Portable Terminal Belonging to WFDNW 210 : Send NW Change Unnecessary Information (S34)<br>(2) In Case of Portable Terminal Belonging to WFDNW Different from WFDNW 210 : Send WSI of WFDNW 210 Prepared by G/O Apparatus (S40) |

(Case B1)

FIG. 11 MFP is Currently Belonging
(Case C) to Both PSNW and WFDNW (G/O Status)

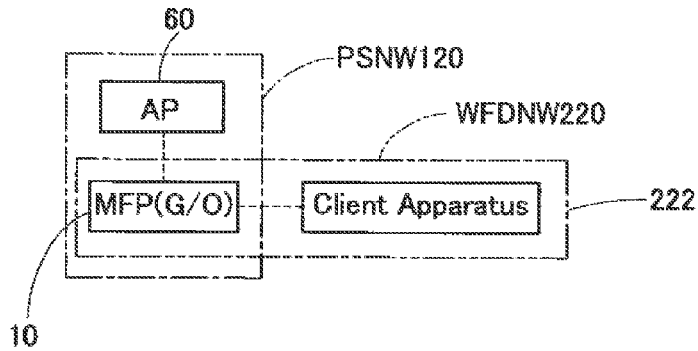

| Case | Portable Terminal | | Process of MFP |
| --- | --- | --- | --- |
| | Normal Wi-Fi | WFD | |
| C1 | × | × | Send WSI of PSNW 120 (S54) |
| C2 | EPNW | × | Send WSI of WFDNW 220 Prepared by MFP (S50) |
| C3 | PSNW | × | (1) In Case of Portable Terminal Belonging to PSNW 120 : Send NW Change Unnecessary Information (S44) (2) In Case of Portable Terminal Belonging to PSNW Different from PSNW 120 : Send WSI of WFDNW 220 Prepared by MFP (S50) |
| C4 | × | G/O | Send WSI of WFDNW 220 Prepared by MFP (S50) |
| C5 | × | Client | (1) In Case of Portable Terminal Belonging to WFDNW 220 (ex. Client Apparatus 222 = Portable Terminal) : Send NW Change Unnecessary Information (S44) (2) In Case of Portable Terminal Belonging to WFDNW Different from WFDNW 220 : Send WSI of WFDNW 220 Prepared by MFP (S50) |

(Case C1)

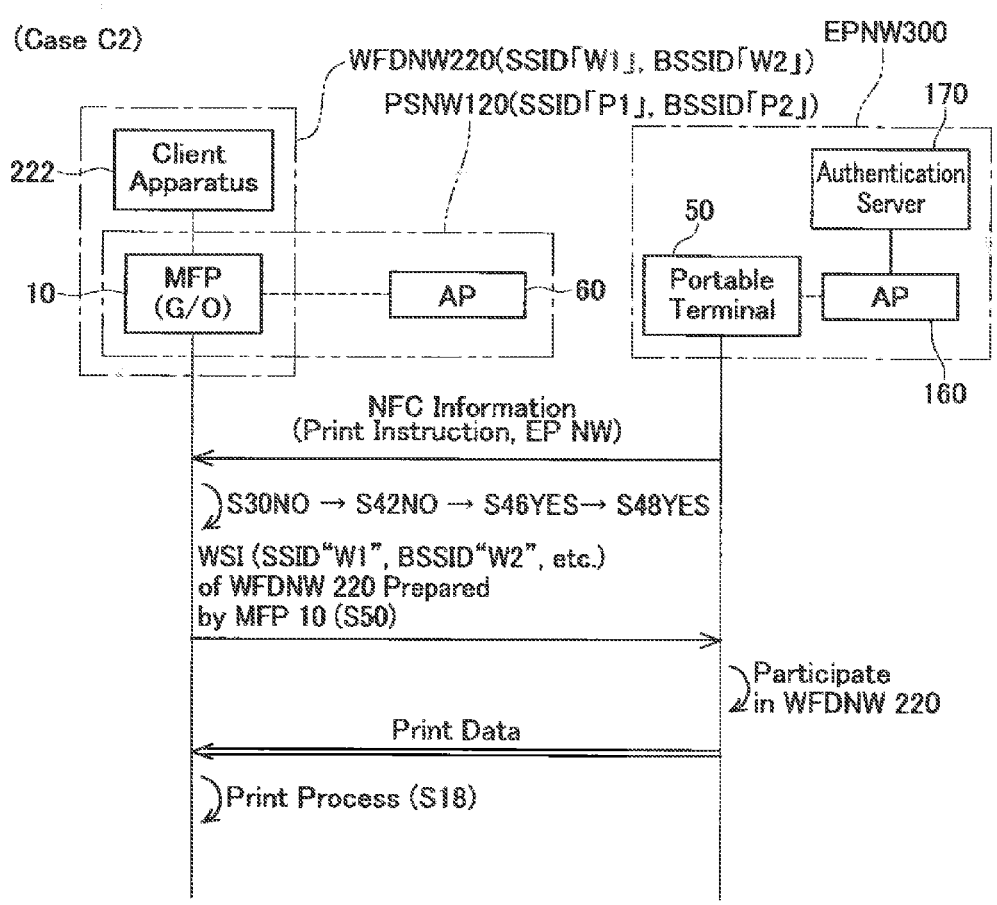

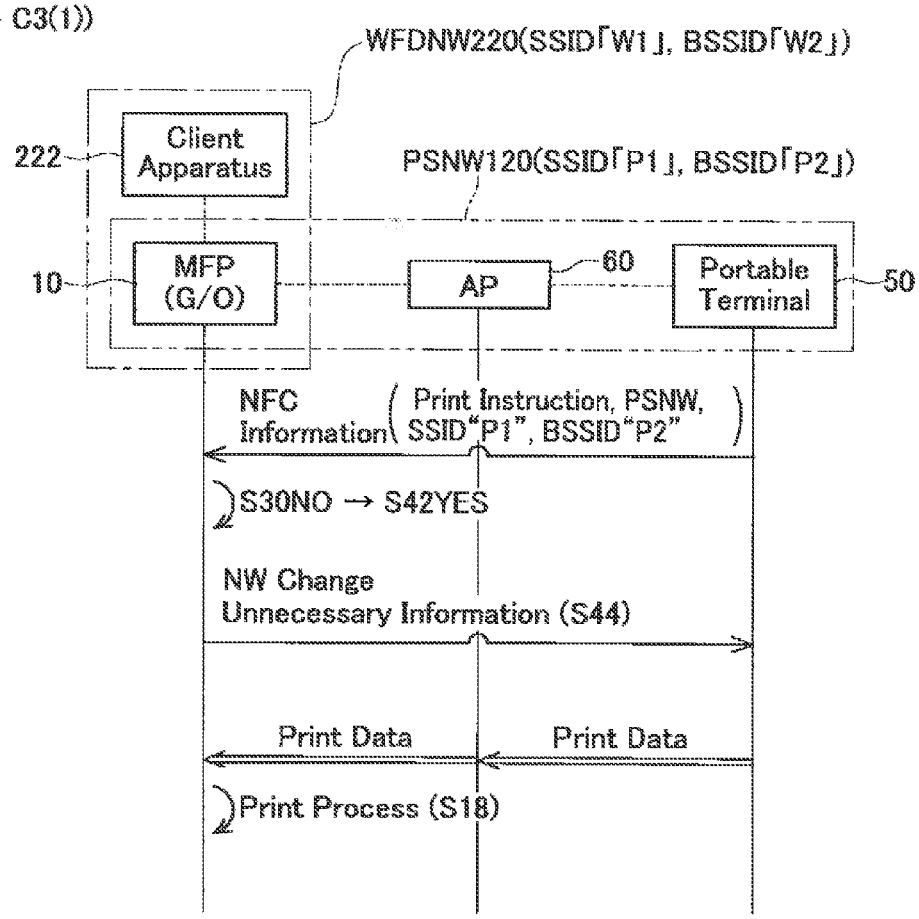

FIG. 15

(Case D) MFP is Currently Belonging to Both PSNW and WFDNW (Client Status)

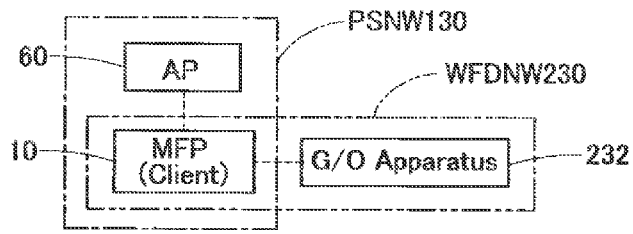

| Case | Portable Terminal | | Process of MFP |
|---|---|---|---|
| | Normal Wi-Fi | WFD | |
| D1 | × | × | Send WSI of PSNW 130 (S54) |
| D2 | EPNW | × | Send WSI of WFDNW 230 Prepared by G/O Apparatus (S52) |
| D3 | PSNW | × | (1) In Case of Portable Terminal Belonging to PSNW 130 : Send NW Change Unnecessary Information (S44) (2) In Case of Portable Terminal Belonging to PSNW Different from PSNW 130 : Send WSI of WFDNW 230 Prepared by G/O Apparatus (S52) |
| D4 | × | G/O | (1) In Case of Portable Terminal Belonging to WFDNW 230 (ex. G/O Apparatus 232 = Portable Terminal) : Send NW Change Unnecessary Information (S44) (2) In Case of Portable Terminal Belonging to WFDNW Different from WFDNW 230 : Send WSI of WFDNW 230 Prepared by G/O Apparatus (S52) |
| D5 | × | Client | (1) In Case of Portable Terminal Belonging to WFDNW 230 : Send NW Change Unnecessary Information (S44) (2) In Case of Portable Terminal Belonging to WFDNW Different from WFDNW 230 : Send WSI of WFDNW 230 Prepared by G/O Apparatus (S52) |

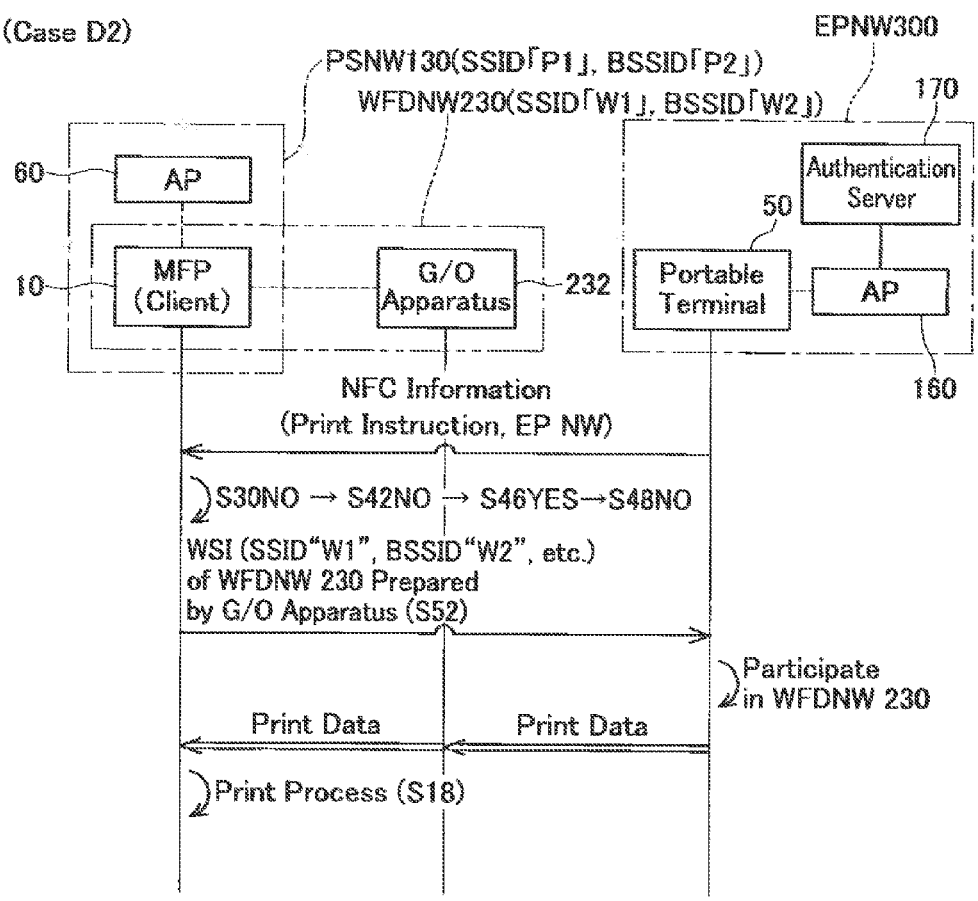

FIG. 17

(Case E)  MFP is Currently Belonging to Only EPNW

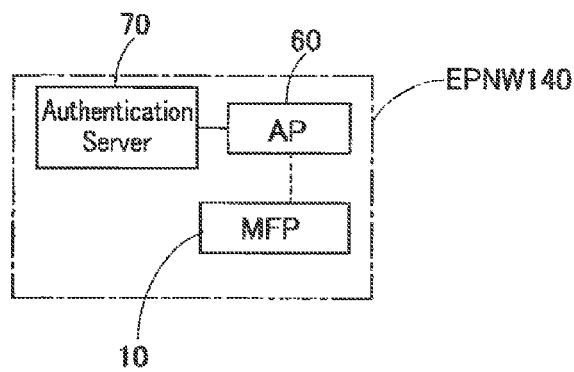

| Case | Portable Terminal | | Process of MFP |
|------|------|------|------|
| | Normal Wi-Fi | WFD | |
| E1 | × | × | Change into Spontaneous G/O Mode (S74) so as to Send WSI of WFDNW Prepared by MFP (S76) |
| E2 | EPNW | × | Change into Spontaneous G/O Mode (S74) so as to Send WSI of WFDNW Prepared by MFP (S76) (S76 is Performed Despite Possibility of Belonging to the Same EPNW 140) |
| E3 | PSNW | × | Change into Spontaneous G/O Mode (S74) so as to Send WSI of WFDNW Prepared by MFP (S76) |
| E4 | × | G/O | Change into Spontaneous G/O Mode (S74) so as to Send WSI of WFDNW Prepared by MFP (S76) |
| E5 | × | Client | Change into Spontaneous G/O Mode (S74) so as to Send WSI of WFDNW Prepared by MFP (S76) |

FIG. 18

(Case F)  MFP is Currently Belonging to Only PSNW

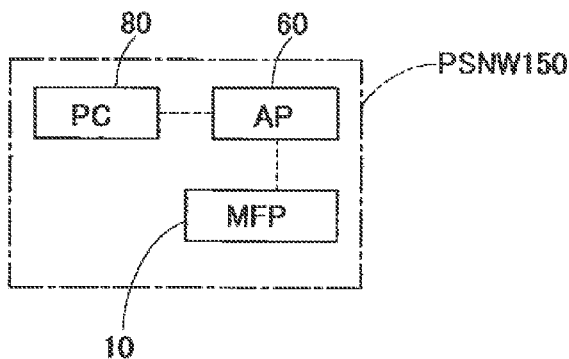

| Case | Portable Terminal | | Process of MFP |
|---|---|---|---|
| | Normal Wi-Fi | WFD | |
| F1 | × | × | Send WSI of PSNW 150 (S84) |
| F2 | EPNW | × | Change into Spontaneous G/O Mode (S74) so as to Send WSI of WFDNW Prepared by MFP (S76) |
| F3 | PSNW | × | (1) In Case of Portable Terminal Belonging to PSNW 150 : Send NW Change Unnecessary Information (S80) (2) In Case of Portable Terminal Belonging to PSNW Different from PSNW 150 : Change into Spontaneous G/O Mode (S74) so as to Send WSI of WFDNW Prepared by MFP (S76) |
| F4 | × | G/O | Change into Spontaneous G/O Mode (S74) so as to Send WSI of WFDNW Prepared by MFP (S76) |
| F5 | × | Client | Change into Spontaneous G/O Mode (S74) so as to Send WSI of WFDNW Prepared by MFP (S76) |

FIG. 19

(Case G) MFP is Currently Belonging to Only WFDNW (G/O Status)

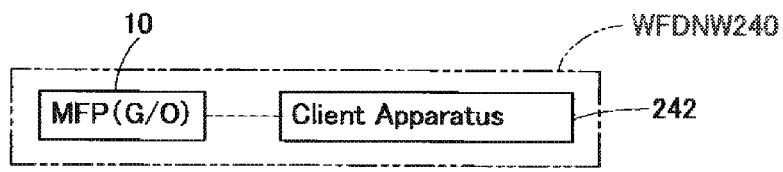

| Case | Portable Terminal | | Process of MFP |
| --- | --- | --- | --- |
| | Normal Wi-Fi | WFD | |
| G1 | × | × | Send WSI of WFDNW 240 Prepared by MFP (S94) |
| G2 | EPNW | × | Send WSI of WFDNW 240 Prepared by MFP (S94) |
| G3 | PSNW | × | Send WSI of WFDNW 240 Prepared by MFP (S94) |
| G4 | × | G/O | Send WSI of WFDNW 240 Prepared by MFP (S94) |
| G5 | × | Client | (1) In Case of Portable Terminal Belonging to WFDNW 240 (ex. Client Apparatus 242 = Portable Terminal): Send NW Change Unnecessary Information (S90)<br><br>(2) In Case of Portable Terminal Belonging to WFDNW Different from WFDNW 240: Send WSI of WFDNW 240 Prepared by MFP (S94) |

FIG. 20

(Case H)  MFP is Currently Belonging to Only WFDNW (Client Status)

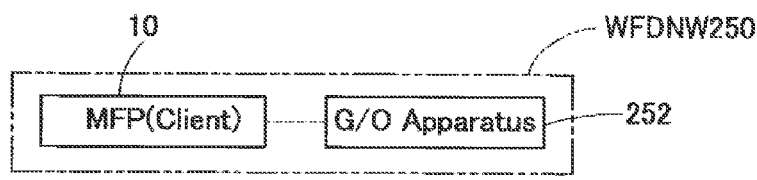

| Case | Portable Terminal | | Process of MFP |
|---|---|---|---|
| | Normal Wi-Fi | WFD | |
| H1 | × | × | Send WSI of WFDNW 250 Prepared by G/O Apparatus (S96) |
| H2 | EPNW | × | Send WSI of WFDNW 250 Prepared by G/O Apparatus (S96) |
| H3 | PSNW | × | Send WSI of WFDNW 250 Prepared by G/O Apparatus (S96) |
| H4 | × | G/O | (1) In Case of Portable Terminal Belonging to WFDNW 250 (ex. G/O Apparatus 252 = Portable Terminal): Send NW Change Unnecessary Information (S90) (2) In Case of Portable Terminal Belonging to WFDNW Different from WFDNW 250: Send WSI of WFDNW 250 Prepared by G/O Apparatus (S96) |
| H5 | × | Client | (1) In Case of Portable Terminal Belonging to WFDNW 250: Send NW Change Unnecessary Information (S90) (2) In Case of Portable Terminal Belonging to WFDNW Different from WFDNW 250: Send WSI of WFDNW 250 Prepared by G/O Apparatus (S96) |

COMMUNICATION DEVICE

CROSS-REFERENCE TO RELATED APPLICATIONS

This application claims priority to Japanese Patent Application No. 2012-111749, filed on May 15, 2012, the contents of which are hereby incorporated by reference into the present application.

TECHNICAL FIELD

The present specification teaches a communication device which executes a wireless communication with a portable terminal.

DESCRIPTION OF RELATED ART

In a certain technique, when a mobile phone establishes an NFC communication with another apparatus, the mobile phone determines whether a Bluetooth (registered trademark) power state of the mobile phone is ON. In a case where the Bluetooth power state is ON, the mobile phone sends a request, in which Bluetooth is a handover target, to the other apparatus by using the NFC communication. In this case, using Bluetooth, the mobile phone executes a wireless communication with the other apparatus. In a case where the Bluetooth power state is not ON, the mobile phone sends a request, in which a communication scheme (Bluetooth or wireless LAN) selected by a user is the handover target, to the other apparatus by using the NFC communication. In this case, the mobile phone executes a wireless communication with the other apparatus using the communication scheme selected by the user.

SUMMARY

In the above technique, a situation has not been taken into consideration in which a mobile phone belongs to a plurality of wireless networks. The present specification teaches a technique in which an appropriate process may be executed in a case where the communication device belongs to a plurality of wireless networks.

One aspect disclosed in the present specification may be a communication device comprising: a first type of interface configured to execute a wireless communication with a portable terminal; a second type of interface configured to execute a wireless communication with the portable terminal, the second type of interface being different from the first type of interface, the second type of interface being an interface for executing a first type of wireless communication via an access point and a second type of wireless communication not via the access point, the access point being constituted separately from the communication device and the portable terminal; and a processor. The processor may be configured to execute: receiving specific information from the portable terminal using the first type of interface; first determining whether a first type of wireless network is an enterprise wireless network, in a case where the communication device currently belongs to both the first type of wireless network for executing the first type of wireless communication and a second type of wireless network for executing the second type of wireless communication when the specific information is received, the enterprise wireless network being a wireless network in accordance with an enterprise type of authentication scheme in which an authentication is performed by an authentication server different from the access point; a sending process comprising sending first wireless setting information to the portable terminal using the first type of interface when it is determined that the first type of wireless network is the enterprise wireless network, the first wireless setting information being information for the portable terminal to participate in the second type of wireless network; and a first particular process different from the sending process when it is determined that the first type of wireless network is not the enterprise wireless network.

A control method, computer-readable instructions, and a computer-readable storage medium storing the computer-readable instructions, all for realizing the communication device, are also novel and useful. Moreover, a communication system comprising the communication device and the portable terminal is also novel and useful.

BRIEF DESCRIPTION OF THE DRAWINGS

FIG. 2 shows a table for explaining an enterprise type of authentication scheme and a personal type of authentication scheme.

FIG. 5 shows a flowchart of a non-multi NW process.

FIG. 6 shows a table representing processes that can be executed by the MFP in case A, in which the MFP belongs to an EPNW and a WFDNW.

FIG. 8 shows a sequence view of case A5 (1), in which the MFP belongs to the EPNW and the WFDNW.

FIG. 9 shows a table representing processes that can be executed by the MFP in case B, in which the MFP belongs to the EPNW and the WFDNW.

FIG. 11 shows a table representing processes that can be executed by the MFP in case C, in which the MFP belongs to a PSNW and the WFDNW.

FIG. 13 shows a sequence view of case C2, in which the MFP belongs to the PSNW and the WFDNW.

FIG. 14 shows a sequence view of case C3 (1), in which the MFP belongs to the PSNW and the WFDNW.

FIG. 15 shows a table representing processes that can be executed by the MFP in case D, in which the MFP belongs to the PSNW and the WFDNW.

FIG. 16 shows a sequence view of case D2, in which the MFP belongs to the PSNW and the WFDNW.

FIG. 17 shows a table representing processes that can be executed by the MFP in case E, in which the MFP belongs to only the EPNW.

FIG. 18 shows a table representing processes that can be executed by the MFP in case F, in which the MFP belongs to only the PSNW.

FIG. 19 shows a table representing processes that can be executed by the MFP in case G, which the MFP belongs to only the WFDNW.

FIG. 20 shows a table representing processes that can be executed by the MFP in case H, in which the MFP belongs to only the WFDNW.

EMBODIMENT (Configuration of Communication System 2)

Figure 1:
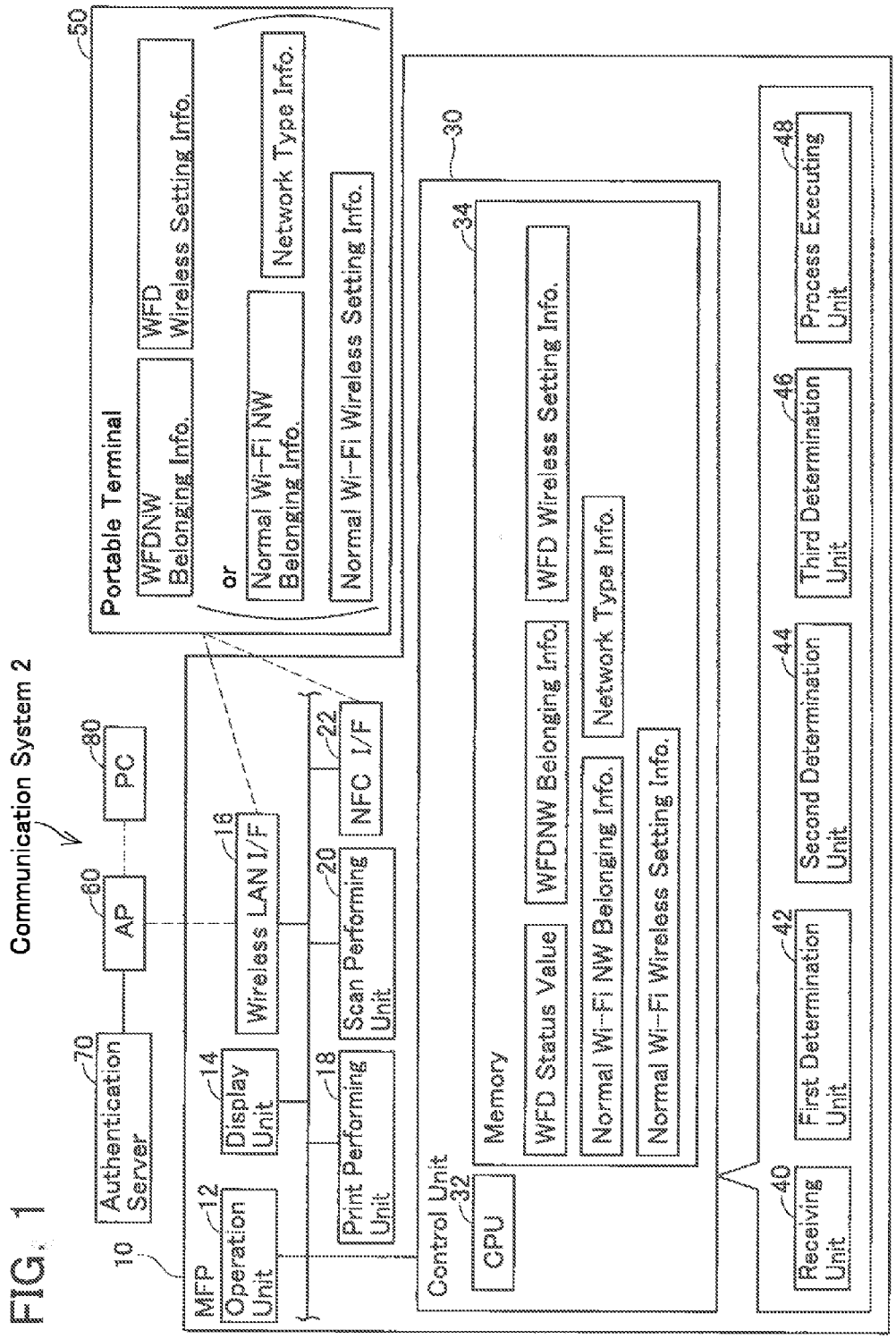
FIG. 1 shows a configuration of a communication system.

As shown in FIG. 1, a communication system 2 comprises a multi-function peripheral 10 (called "MFP" below), a portable terminal 50, an access point 60 (called "AP" below), an authentication server 70, and a PC 80 (abbreviation of Personal Computer).

(Wireless Communication Types that MFP 10 is Capable of Executing)

The MFP 10 is capable of executing wireless communication in accordance with an NFC (abbreviation of Near Field Communication) scheme, wireless communication in accordance with a WFD (abbreviation of Wi-Fi Direct) scheme, and wireless communication in accordance with a normal Wi-Fi scheme. Below, wireless communication in accordance with the above schemes is called "NFC communication", "WFD communication", and "normal Wi-Fi communication" respectively.

(NFC Communication)

The NFC scheme is a wireless communication scheme for so-called near field communication, e.g., is a wireless communication scheme based on international standard ISO/IEC21481 or 18092. The MFP 10 is capable of executing NFC communication with the portable terminal 50.

(WFD Communication)

The WFD scheme is a wireless communication scheme described in the specification "Wi-Fi Peer-to-Peer (P2P) Technical Specification Version 1.1", created by Wi-Fi Alliance, The WFD scheme is a wireless communication scheme for executing wireless communication in accordance with, e.g., IEEE (abbreviation of the Institute of Electrical and Electronics Engineers, Inc.) 802.11 standard, and standards based thereon (e.g., 802.11a, 11b, 11g, 11n, etc.).

By belonging to a WFD network, the MFP 10 can execute the WFD communication of object data with another apparatus belonging to that WFD network. The object data is data that includes network layer information of an OSI reference model e.g., includes print data, scan data, etc. In the present embodiment, the portable terminal 50 and the PC 80 are also capable of executing WFD communication, Consequently, the MFP 10 is capable of executing the WFD communication of object data with the portable terminal 50 and the PC 80. Moreover, below, the WFD network may be abbreviated to "WFDNW".

Below, an apparatus capable of executing WFD communication, like the MFP 10, the portable terminal 50, and the PC 80, is called a "WFD-compatible apparatus". According to the WFD specification, three statuses are defined as the statuses of the WFD-compatible apparatus: Group Owner status (called "G/O status" below), client status, and device status. The WFD-compatible apparatus is capable of selectively operating in one status among the three statuses.

When a pair of WFD-compatible apparatuses that is in the device status is to form a WFDNW, wireless communication that is termed G/O negotiation is normally executed between the pair of WFD-compatible apparatuses. In the G/O negotiation, one of the pair of WFD-compatible apparatuses is determined to operate in the G/O status, and the other of the pair of WFD-compatible apparatuses is determined to operate in the client status. The WFDNW is formed by the G/O status apparatus (called "G/O apparatus" below) and the client status apparatus (called "client apparatus" below). In the WFDNW, one G/O apparatus and one or more client apparatuses can be present. The G/O apparatus manages the one or more client apparatuses. Specifically, for each of the one or more client apparatuses, the G/O apparatus executes authentication of the client apparatus and, when the authentication of the client apparatus succeeds, writes identification information (i.e., MAC address) of the client apparatus into an administration list within a memory of the G/O apparatus. Moreover, in the present embodiment, in the WFDNW to which the MFP 10 belongs, the G/O apparatus (i.e., the MFP 10, or a G/O apparatus different from the MFP 10) executes authentication of the client apparatus by using "WPA2-PSK", which is a personal type of authentication scheme (to be described: see FIG. 2), and an encryption scheme "AES". When the client apparatus leaves the WFDNW, the G/O apparatus deletes the identification information of the client apparatus from the administration list.

The G/O apparatus is capable of executing the wireless communication of the object data with the client apparatus registered in the administration list. However, with an unregistered apparatus which is not registered in the administration list, the G/O apparatus is capable of executing the wireless communication of specific data for the unregistered apparatus to belong to the WFDNW, but is not capable of wirelessly executing the wireless communication of the object data. The specific data is data that does not include network layer information of the OSI reference model, e.g., includes physical layer data such as a Probe Request signal, Probe Response signal, etc.

Further, the G/O apparatus is capable of relaying the wireless communication of object data between a plurality of client apparatuses. For example, a situation is assumed in which the MFP 10 is in the G/O status, and the portable terminal 50 and another MFP are in the client status. In a case where the portable terminal 50 is to send print data to the other MFP, the portable terminal 50 first sends the print data to the MFP 10 that is in the G/O status. In this case, the MFP 10 receives the print data from the portable terminal 50, and sends the print data to the other MFP. That is, the MFP 10 relays the wireless communication of object data between the portable terminal 50 and the other MFP.

A WFD-compatible apparatus that does not belong to the WFDNW (i.e., the unregistered apparatus that is not registered in the administration list of the G/O apparatus) is a device status apparatus. The device status apparatus is capable of wirelessly communicating the specific data with the G/O apparatus for belonging to the WFDNW, but is not capable of wirelessly communicating object data with the G/O apparatus or the client apparatus.

As described above, in the WFDNW, the WFD communication of the object data can be executed between a WFD-compatible apparatus (e.g., the portable terminal 50) that is the source of the object data, and a WFD-compatible apparatus (e.g., the MFP 10) that is the destination of the object data, without going via the AP 60 which is constituted separately from these WFD-compatible apparatuses. That is, the WFD communication can be said to be wireless communication not via the AP 60.

Moreover, below, an apparatus that is not capable of selectively operating in one status from among the three statuses defined in the specification of the WFD (i.e., G/O status, client status, device status), but is capable of executing wireless communication via the AP 60 (i.e., normal Wi-Fi communication: to be described) is called a "WFD-incompatible apparatus". The "WFD-incompatible apparatus" may also be called a "legacy apparatus". A G/O status apparatus can register identification information of the WFD-incompatible apparatus in the administration list. In this case, the WFD-incompatible apparatus can participate in the WFDNW as a client apparatus.

(Normal Wi-Fi Communication)

The normal Wi-Fi scheme is a wireless communication scheme determined by Wi-Fi Alliance, and is a wireless communication scheme different from the WFD scheme. As with the WFD scheme, the normal Wi-Fi scheme is a wireless communication scheme for executing wireless communication in accordance with IEEE 802.11 standard and standards based thereon (e.g., 802.11a, 11b, 11g, 11n, etc.). However, as described above, the WFD scheme is a wireless communication scheme for executing wireless communication not via the AP 60. By contrast, the normal Wi-Fi scheme is a wireless communication scheme for executing wireless communication via the AP 60. The WFD scheme and the normal Wi-Fi scheme differ on this point.

By belonging to a normal Wi-Fi network, the MFP 10 can execute, via the AP 60, the normal Wi-Fi wireless communication of object data with another apparatus belonging to that normal Wi-Fi network. In the present embodiment, the portable terminal 50 and the PC 80 are also capable of executing normal Wi-Fi communication. Consequently, the MFP 10 is capable of executing the normal Wi-Fi communication of object data with the portable terminal 50 and the PC 80 via the AP 60. Moreover, below, the normal Wi-Fi network may be abbreviated to "normal Wi-Fi NW".

Normal Wi-Fi communication is classified into wireless communication in accordance with an enterprise type of authentication scheme in which the authentication server 70 executes authentication, and wireless communication in accordance with a personal type of authentication scheme in which the AP 60 executes authentication. Moreover, below, the normal Wi-Fi NW in accordance with the enterprise type of authentication scheme, and the normal Wi-Fi NW in accordance with the personal type of authentication scheme are called "enterprise network" and "personal network" respectively. Further, the "enterprise network" and the "personal network" may be abbreviated to "EPNW" and "PSNW" respectively.

(Enterprise Type of Authentication Scheme)

As described above, in the enterprise type of authentication scheme, the authentication server 70, which is constituted separately from the AP 60, executes authentication. As shown in the table of FIG. 2, the enterprise type of authentication scheme is determined by a combination of an authentication protocol, and an EAP (abbreviation of Extensible Authentication Protocol) authentication scheme. The enterprise type of authentication scheme adopts three types of authentication protocol: IEEE802.1X, WPA (abbreviation of Wi-Fi Protected Access)-Enterprise, and WPA2-Enterprise. WPA-Enterprise is a standard that complies with IEEE802,1X and has been developed further. WPA2-Enterprise is a standard that incorporates WPA-Enterprise and has been developed further. That is, in general terms, the enterprise type of authentication scheme is an authentication scheme using IEEE802.1X.

LEAP (abbreviation of Lightweight EAP) is used as the EAP authentication scheme in IEEE802.1X, CKIP (abbreviation of Cisco Key Integrity Protocol) is used as the encryption scheme in LEAP.

In WPA-Enterprise and WPA2-Enterprise, EAP-FAST (abbreviation of EAP Flexible Authentication via Secured Tunnel), PEAP (abbreviation of: Protected EAP), EAP-TTLS (abbreviation of EAP Tunneled Transport Layer Security), and EAP-TLS (abbreviation of EAP Transport Layer Security) are used as the EAP authentication schemes, In the EAP authentication schemes corresponding to WPA-Enterprise, IMP (abbreviation of Temporal Key Integrity Protocol) is used as the encryption scheme. In the EAP authentication schemes corresponding to WPA2-Enterprise, AES (abbreviation of Advanced Encryption Standard) is used as the encryption scheme.

Further, in the case where the EAP authentication scheme is EAP-FAST, PEAP, or EAP-TTLS, the authentication server 70 executes inner authentication. Consequently, in the table of FIG. 2, inner authentication schemes are described in association with these EAP authentication schemes. The inner authentication schemes are classified into: NONE, MSCHAP (abbreviation of Microsoft Challenge Handshake Authentication Protocol), MSCHAPv2 (abbreviation of MSCHAP version2), GTC (abbreviation of Generic Token Card), TLS (abbreviation of Transport Layer Security), and PAP (abbreviation of Password Authentication Protocol). "NONE" is a type of inner authentication scheme, and does not mean that an inner authentication scheme is not present. The inner authentication scheme that can be used differs according to the combination of authentication protocol and EAP authentication scheme. For example, any one of the inner authentication schemes NONE, MSCHAPv2, GTC, and TLS is used in the combination WPA-Enterprise and EAP-FAST, and any one of the inner authentication schemes MSCHAPv2, GTC, and TLS is used in the combination WPA2-Enterprise and PEAP.

In the case where the EAP authentication scheme is LEAP or EAP-TLS, the authentication server 70 does not execute inner authentication. Consequently, in the table of FIG. 2, an inner authentication scheme is not written in association with these EAP authentication schemes.

Moreover, in the case where the EAP authentication scheme is LEAP, EAP-FAST, PEAP, or EAP-TTLS, the authentication server 70 executes authentication using a user ID and a password. On the other hand, in the case where the EAP authentication scheme is EAP-TLS, the authentication server 70 executes authentication using the user ID and a client certificate.

(Personal Type of Authentication Scheme)

As described above, in the personal type of authentication scheme, the AP 60 executes authentication. The personal type of authentication scheme uses four types of authentication protocol: WPA-PSK (abbreviation of WPA Pre-shared Key), WPA2-PSK, Open, and Shared key. Moreover, "Open" is a protocol in which authentication is not executed, but is treated in the present specification as a type of authentication scheme. In general terms, the personal type of authentication scheme is an authentication scheme that does not use IEEE802.1x. Further, the personal type of authentication scheme is an authentication scheme that does not use an EAP authentication scheme.

In WPA-PSK and WPA2-PSK, the encryption schemes TKIP or AES are used. In Open, either the encryption scheme WEP (abbreviation of Wired Equivalent Privacy) is used, or an encryption scheme is not used. In Shared key, the encryption scheme WEP is used. Moreover, in the personal type of authentication scheme, the AP 60 does not execute inner authentication. Consequently, in the table of FIG. 2, an inner authentication scheme is not written in association with the personal type of authentication scheme. In the personal type of authentication scheme, the AP 60 executes authentication using a password (more specifically, a Wep Key or a passphrase).

The enterprise type of authentication scheme normally has higher security than the personal type of authentication scheme. The reason is as follows. In the personal type of authentication scheme, the AP 60 executes authentication whereas, in the enterprise type of authentication scheme, the authentication server 70, which is constituted separately from the AP 60, executes authentication. Further, EAP authentication is not executed in the personal type of authentication scheme, whereas EAP authentication is executed in the enterprise type of authentication scheme. Further, inner authentication is not executed in the personal type of authentication scheme, whereas inner authentication may be executed in the enterprise type of authentication scheme. For example, a company, etc. which is focusing on strengthening the security of wireless communication will tend to improve the security of wireless communication by constructing a wireless LAN of an EPNW that includes the authentication server 70. Further, e.g., a normal household, etc. usually constructs a wireless LAN of a PSNW because it is difficult to provide the authentication server 70.

As described above, a normal Wi-Fi NW (i.e., EPNW or PSNW) is a wireless network constructed in an environment in which the AP 60 can be installed, as with a company LAN, home LAN, etc. In general terms, it is a wireless network that is to remain formed constantly. By contrast, since the WFDNW does not need the AP 60, it is a wireless network to be constructed for executing, e.g., temporary wireless communication between a pair of WFD-compatible apparatuses. In general terms, it is a wireless network that is to be constructed temporarily. Thus, in the present embodiment, a situation is assumed in which the normal Wi-Fi NW is a wireless network that is to remain formed constantly, and the WFDNW is a wireless network that is to he formed temporarily.

(Configuration of MFP 10)

The MFP 10 is capable of executing multiple functions including a print function and a scan function. As shown in FIG. 1, the MFP 10 comprises an operation unit 12, a display unit 14, a wireless LAN interface 16 (interface is called "I/F" below), a print performing unit 18, a scan performing unit 20, an NFC I/F 22, and a control unit 30. The units 12 to 30 are connected to a bus line (reference number omitted).

The operation unit 12 consists of a plurality of keys. The user can input various instructions to the MFP 10 by operating the operation unit 12. The display unit 14 is a display for displaying various information. The print performing unit 18 is an ink jet system, laser system, etc. printing mechanism. The scan performing unit 20 is a CCD, CIS, etc. Scanning mechanism.

The wireless LAN I/F 16 is an interface for executing WFD communication and normal Wi-Fi communication. The wireless LAN I/F 16 is physically one interface (i.e., one IC chip). However, a MAC address used in WFD communication (called "MAC address for WFD" below) and a MAC address used in normal Wi-Fi communication (called "MAC address for normal Wi-Fi" below) can both be assigned to the wireless LAN I/F 16. Specifically, the MAC address for normal Wi-Fi is pre-assigned to the wireless LAN I/F 16. Using the MAC address for normal Wi-Fi, the control unit 30 creates the MAC address for WFD, this being different from the MAC address for normal Wi-Fi, and assigns the MAC address for WFD to the wireless LAN I/F 16. Consequently, the control unit 30 can simultaneously execute both normal Wi-Fi communication using the MAC address for normal Wi-Fi, and WFD communication using the MAC address for WFD. That is, the MFP 10 can simultaneously belong to both the WFDNW and the normal Wi-Fi NW.

In terms of the MAC address used by the MFP 10, the WFD communication and normal Wi-Fi communication can be expressed, e.g., as follows. That is, the WFD Communication is wireless communication in which the MAC address for WFD of the MFP 10 is used, and the normal Wi-Fi communication is wireless communication in which the MAC address for normal Wi-Fi of the MFP 10 is used. Further, the WFDNW is a wireless network in which the MAC address for WFD of the MFP 10 is used, and the normal Wi-Fi NW is a wireless network in which the MAC address for normal Wi-Fi of the MFP 10 is used.

The NFC I/F 22 is an interface for executing NFC communication. A chip constituting the NFC I/F 22 is physically different from the chip constituting the wireless LAN I/F 16.

The communication speed of wireless communication using the wireless LAN I/F 16 (e.g., maximum communication speed is 11 to 600 Mbps) is faster than the communication speed of wireless communication using the NFC I/F 22 (e.g., maximum communication speed is 100 to 424 Kbps). Further, a frequency of the carrier wave in wireless communication using the wireless LAN I/F 16 (e.g., 2.4 GHz band, 5.0 GHz band) differs from a frequency of the carrier wave in wireless communication using the NFC I/F 22 (e.g., 13.56 MHz band). Further, e.g., in the case where a distance between the MFP 10 and the portable terminal 50 is less than or equal to approximately 10 cm, the control unit 30 is capable of executing NFC communication with the portable terminal 50 by using the NFC I/F 22. On the other hand, in the case where the distance between the MFP 10 and the portable terminal 50 is either less than or equal to 10 cm, or is greater than or equal to 10 cm (e.g., at maximum is approximately 100 m), the control unit 30 is capable of executing WFD communication and normal Wi-Fi communication with the portable terminal 50 by using the wireless LAN I/F 16. That is, the maximum distance across which the MFP 10 can execute wireless communication with a communication destination apparatus (e.g., the portable terminal 50) by using the wireless LAN I/F 16 is greater than the maximum distance across which the MFP 10 can execute wireless communication with the communication destination apparatus by using the NFC I/F 22.

The control unit 30 comprises a CPU 32 and a memory 34. The CPU 32 executes various processes according to programs stored in the memory 34. The CPU 32 realizes the functions of the units 40 to 48 by executing processes according to the programs. The memory 34 consists of a ROM, RAM, hard disk, etc. The memory 34 stores the programs executed by the CPU 32.

The memory 34 further stores a WFD status value indicating the current status of the MFP 10 relating to WFD (i.e., any status of G/O status, client status, and device status). In the case where the MFP 10 belongs to the WFDNW (i.e., in the case where the WFD status value indicates G/O status or client status), the memory 34 further stores WFDNW belonging information indicating that the MFP 10 belongs to a WFDNW, and WFD wireless setting information for executing WFD communication.

The WFD wireless setting information includes an authentication protocol, encryption scheme, password, SSID (Service Set Identifier), and BSSID (Basic Service Set Identifier). The SSID included in the WFD wireless setting information is a network identifier for identifying the WFDNW. The BSSID included in the WFD wireless setting information is a unique identifier (e.g., the MAC address of the G/O apparatus) assigned to the G/O apparatus of the WFDNW. Below, the WFD wireless setting information may be called the "WSI (abbreviation of Wireless Setting Information) of WFDNW".

When forming a WFDNW, the G/O apparatus normally prepares the WFD wireless setting information (i.e., the WSI of WFDNW), and supplies the WFD wireless setting information to the client apparatus. For example, the control unit 30 of the MFP 10 prepares the WFD wireless setting information when the MFP 10 is operating in the G/O status and forms the WFDNW. Specifically, the control unit 30 prepares a predetermined authentication protocol (i.e., WPA2-PSK) and an encryption scheme (i.e., AES). The control unit 30 prepares a predetermined password, or prepares a password by newly creating a password. The control unit 30 prepares a predetermined SSID, or prepares a SSID by newly creating a SSID. Further, the control unit 30 prepares a predetermined MAC address for WFD as the BSSID.

Consequently, in the case where the MFP 10 is operating in the G/O status and belongs to a WFDNW, the memory 34 stores the WFD wireless setting information that was prepared by the MFP 10 when the MFP 10 formed the WFDNW. On the other hand, in the case where the MFP 10 is operating in the client status and belongs to a WFDNW, the memory 34 stores the WFD wireless setting information that was prepared by a G/O apparatus different from the MFP 10 when that G/O apparatus formed the WFDNW (i.e., the WFD wireless setting information acquired from that G/O apparatus).

Further, in the case where the MFP 10 belongs to a normal Wi-Fi NW, the memory 34 further stores the normal Wi-Fi NW belonging information indicating that the MFP 10 belongs to a normal Wi-Fi NW, network type information indicating the type of normal Wi-Fi NW (i.e., one of the enterprise network (EPNW) or the personal network (PSNW)), and normal Wi-Fi wireless setting information for executing normal Wi-Fi communication.

In the case where the MFP 10 belongs to an EPNW, the normal Wi-Fi wireless setting information normally includes an authentication protocol, EAP authentication scheme, encryption scheme, inner authentication scheme, user ID, password, SSID, and BSSID. However, in the case where the EAP authentication scheme is LEAP or EAP-TLS, the normal Wi-Fi wireless setting information does not include an inner authentication scheme (see FIG. 2). Further, in the case where the EAP authentication scheme is EAP-TLS, the normal Wi-Fi wireless setting information includes a client certificate instead of a password. Below, the normal Wi-Fi wireless setting information of an EPNW may be called "WSI of EPNW".

On the other hand, in the case where the MFP 10 belongs to a PSNW, the normal Wi-Fi wireless setting information normally includes an authentication protocol, encryption scheme, password, SSID, and BSSID. Below, the normal Wi-Fi wireless setting information of a PSNW may be called "WSI of PSNW".

The SSID included in the normal Wi-Fi wireless setting information is a network identifier for identifying the normal Wi-Fi NW (EPNW or PSNW). The BSSID included in the normal Wi-Fi wireless setting information is a unique identifier (e.g., the MAC address of the AP 60) assigned to the AP 60 of the normal Wi-Fi NW.

For example, in the case where the MFP 10 participates in a PSNW in accordance with a so-called automatic wireless setting mode (e.g., WPS (abbreviation of Wi-Fi Protected Setup), AOSS (abbreviation of Air station One-touch Secure System)), the normal Wi-Fi wireless setting information (i.e., the WSI of PSNW) is supplied from the AP 60 to the MFP 10. In this case, the memory 34 stores the normal Wi-Fi wireless setting information supplied from the AP 60. Further, e.g., in the case where the MFP 10 participates in a PSNW or an EPNW in accordance with a so-called manual wireless setting mode, the normal Wi-Fi wireless setting information (i.e., the WSI of PSNW or the WSI of EPNW) is specified by the user of the MFP 10 (e.g., the user operates the operation unit 12 to input the normal Wi-Fi wireless setting information). In this case, the memory 34 stores the normal Wi-Fi wireless setting information specified by the user.

(Configuration of Portable Terminal 50)

The portable terminal 50 is a portable terminal device such as, e.g., a mobile phone (e.g., Smart Phone), PDA, notebook PC, tablet PC, portable music playback device, portable video playback device, etc. As with the MFP 10, the portable terminal 50 is capable of executing NFC communication, WFD communication, and normal Wi-Fi communication. However, unlike the MFP 10, the portable terminal 50 cannot simultaneously execute both WFD communication and normal Wi-Fi communication. That is, the portable terminal 50 cannot simultaneously belong to both a WFDNW and a normal Wi-Fi NW, but can belong to only one network of the WFDNW and the normal Wi-Fi NW.

The portable terminal 50 comprises an application program for causing the MFP 10 to execute a function (e.g., print function, scan function, etc.). The application program may, for example, be installed on the portable terminal 50 from a server provided by a vendor of the MFP 10, or may be installed on the portable terminal 50 from a media shipped together with the MFP 10.

Like the MFP 10, a memory (not shown) of the portable terminal 50 stores various information in accordance with the wireless network to which the portable terminal 50 belongs. For example, in the case where the portable terminal 50 belongs to a WFDNW, the memory of the portable terminal 50 stores WFDNW belonging information indicating that the portable terminal 50 belongs to a WFDNW, and WFD wireless setting information (i.e., the WSI of WFDNW). Further, in the case where the portable terminal 50 belongs to a normal Wi-Fi NW, the memory of the portable terminal 50 stores normal Wi-Fi NW belonging information indicating that the portable terminal 50 belongs to a normal Wi-Fi NW, network type information indicating the type of normal Wi-Fi NW (EPNW or PSNW), and normal Wi-Fi wireless setting information (i.e., the WSI of EPNW or the WSI of PSNW).

(Configuration of AP 60)

The AP 60 is not a G/O apparatus of an WFD, but is a standard AP called a wireless access point or wireless LAN router, and forms a normal network. The AP 60 receives object data from a first apparatus (e.g., the portable terminal 50) from among a plurality of apparatuses belonging to the normal Wi-Fi NW, and sends the object data to a second apparatus (e.g., the MFP 10) from among the plurality of apparatuses. That is, the AP 60 relays the wireless communication of object data between a pair of apparatuses belonging to the normal Wi-Fi network.

In the case where the AP 60 has formed a PSNW, the AP 60 executes authentication of an apparatus that is to newly participate in the PSNW. On the other hand, in the ease where the AP 60 has formed an EPNW, the AP 60 does not execute authentication of an apparatus that is to newly participate in the EPNW. In this case, the authentication server 70 executes authentication of that apparatus.

Moreover, differences between the WFD G/O apparatus and the normal AP (i.e., the AP 60) are as follows. In the case where the WFD G/O apparatus leaves the WFDNW to which that apparatus currently belongs, and newly belongs to another WFDNW, the WFD G/O apparatus can operate in a status other than the G/O status (i.e., the client status). By contrast, the normal AP executes the function of relaying wireless communication between a pair of apparatuses regardless of which normal Wi-Fi NW the AP belongs to. That is, the normal AP can only execute the same operations as the G/O status of the WFD, and cannot execute the same operations as the client status of the WFD.

(Configuration of Authentication Server 70)

The authentication server 70 is a Radius authentication server, and executes authentication of apparatuses that are to newly participate in an EPNW. The authentication server 70 is connected so as to be capable of communication with the AP 60. The authentication server 70 is connected so as to be capable of wired or wireless communication with the AP 60, in the present embodiment, the authentication server 70 is connected with the AP 60 so as to be capable of wired communication. Consequently, in FIG. 1, the line between the AP 60 and the authentication server 70 is a solid line indicating that wired communication can be executed. By contrast, wireless communication is executed between e.g., the AP 60 and the MFP 10. Consequently, in FIG. 1, the line between the AP 60 and the MFP 10 (the wireless LAN I/F 16) is a broken line indicating that wireless communication can be executed. Moreover, the other broken lines in FIG. 1 also indicate that wireless communication can be executed.

(Configuration of PC 80)

The PC 80 is capable of executing WFD communication and normal Wi-Fi communication, However, the PC 80 is not capable of executing NFC communication. The PC 80 comprises a driver program for causing the MFP 10 to execute a function (e.g., print function, scan function, etc.). The driver program is usually installed on the PC 80 from a media shipped together with the MFP 10. However, in a variant, the driver program may be installed on the PC 80 from a server provided by the vendor of the MFP 10.

(Communication Process Executed by MFP 10)

Next, the contents of a communication process executed by the MFP 10 will be described with reference to FIG. 3 to FIG. 5. However, before this, the contents of a process executed by the portable terminal 50 in response to a user operation will be described.

In the case of wishing to cause the MFP 10 to execute the print function or scan function, the user of the portable terminal 50 activates an application program. Next, the user executes a function selecting operation for selecting the function the MFP 10 is to execute. Thereby, the portable terminal 50 creates NFC information that includes an instruction indicating the function the MFP 10 is to execute (i.e., print instruction or scan instruction), and NW information related to the wireless network of the portable terminal 50.

As described above, in the case where the portable terminal 50 belongs to a WFDNW, the memory of the portable terminal 50 stores the WFDNW belonging information and the WFD wireless setting information (i.e., the WSI of WFDNW). In this case, the NW information includes information indicating the WFDNW, and the SSID and BSSID of the WSI of WFDNW.

Further, in the case where the portable terminal 50 belongs to a normal Wi-Fi NW, the memory of the portable terminal 50 stores the normal Wi-Fi NW belonging information, the network type information indicating EPNW or PSNW, and the normal Wi-Fi wireless setting information (i.e., the WSI of EPNW or the WSI of PSNW). In the case where the portable terminal 50 belongs to an EPNW, i.e., in the case where the network type information indicates EPNW, the NW information includes information indicating the EPNW, and does not include the SSID and BSSID of the WSI of EPNW. Thereby, information (i.e., SSID and BSSID) related to the EPNW, which is needed to ensure security, can be prevented from being sent to the exterior of the portable terminal 50. On the other hand, in the case where the portable terminal 50 belongs to a PSNW, i.e., in the case where the network type information indicates PSNW, the NW information includes information indicating the PSNW, and the SSID and BSSID of the WSI of PSNW.

Further, in the case where the portable terminal 50 does not belong to either a WFDNW or a normal Wi-Fi NW, i.e., in the case where the portable terminal 50 does not belong to any wireless network, the NW information includes information indicating no NW.

While the power of the MFP 10 is ON, the NFC I/F 22 of the MFP 10 transmits detecting waves for detecting an apparatus capable of executing NFC communication (i.e., the portable terminal 50). After executing the function selecting operation, the user of the portable terminal 50 brings the portable terminal 50 closer to the MFP 10, Thereby, the distance between the portable terminal 50 and the MFP 10 becomes less than the distance (e.g., 10 cm) where the radio waves reach each other. In this case, the portable terminal 50 receives a detecting wave from the MFP 10, and sends a response wave to the MFP 10. Consequently, an NFC communication session is established between the MFP 10 and the portable terminal 50. Using the NFC communication session, the portable terminal 50 sends the created NFC information to the MFP 10.

Figure 3:
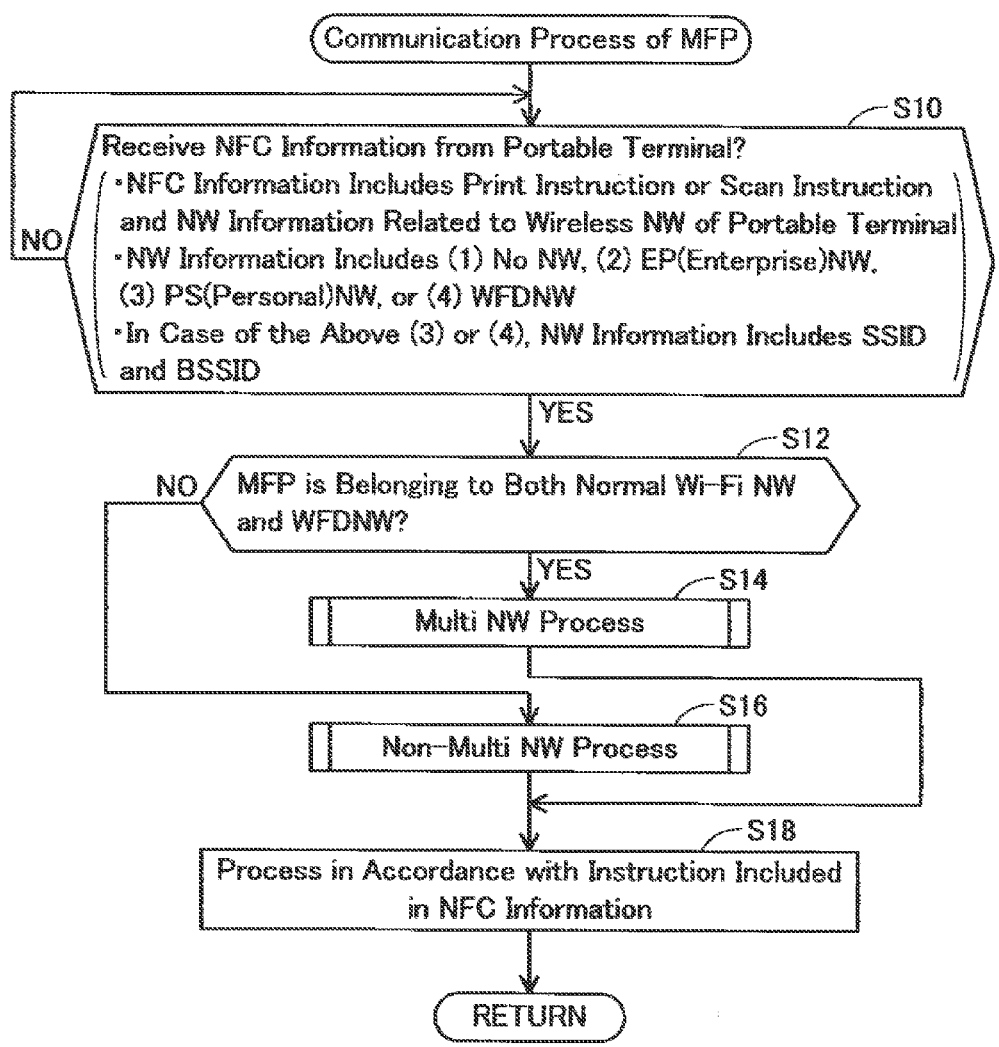
FIG. 3 shows a flowchart of a communication process executed by an MFP.

As shown in FIG. 3, in S10 a receiving unit 40 of the MFP 10 monitors whether NFC information is received from the portable terminal 50. The receiving unit 40 receives the NFC information from the portable terminal 50 by using the NFC I/F 22. In this case, the receiving unit 40 determines YES in S10, and the process proceeds to S12.

In S12 the control unit 30 determines whether the MFP 10 currently belongs to both a normal Wi-Fi NW and a WFDNW. Specifically, in the case where both normal Wi-Fi NW belonging information and WFDNW belonging information are being stored in the memory 34, the control unit 30 determines that the MFP 10 currently belongs to both the normal Wi-Fi NW and the WFDNW (i.e., YES in S12), and the process proceeds to S14. On the other hand, in the case where only normal Wi-Fi NW belonging information is being stored in the memory 34, in the case where only WFDNW belonging information is being stored in the memory 34, or in the case where neither information is being stored in the memory 34, the control unit 30 determines that the MFP 10 does not currently belong to both the normal Wi-Fi NW and the WFDNW (i.e., NO in S12), and the process proceeds to S16.

Figure 4:
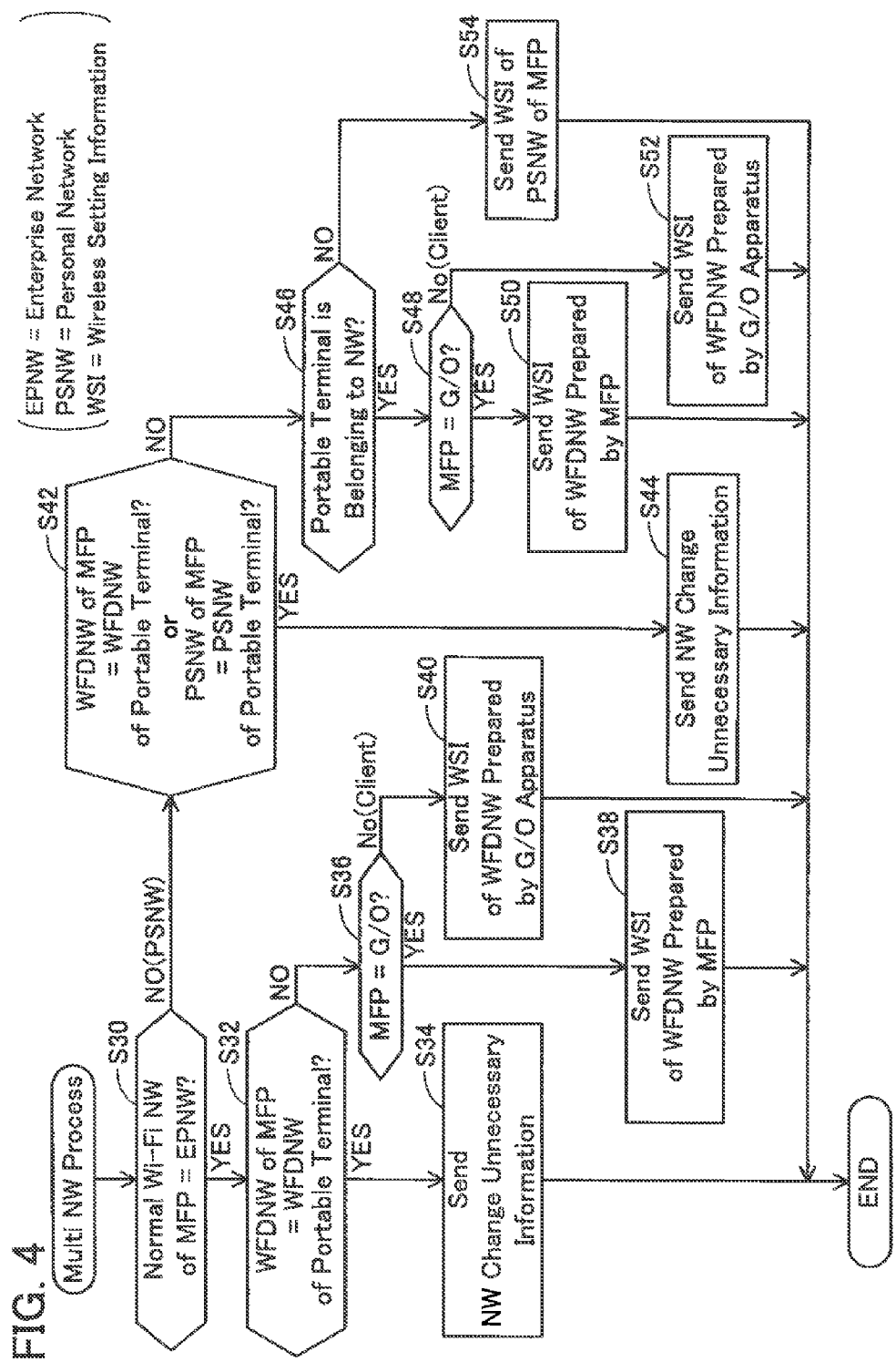
FIG. 4 shows a flowchart of a multi NW process.

In S14 the control unit 30 executes a multi NW process of FIG. 4. In S16 the control unit 30 executes a non-multi NW process of FIG. 5. When S14 or S16 ends, in S18 the control unit 30 executes a process (i.e., print process or scan process) accordance with an instruction (i.e., print instruction or scan instruction) included in the received NFC information. When S18 ends, the process returns to S10. Below, the contents of the processes S14 to S18 will be described in detail.

(Multi NW Process; FIG. 4)

The contents of the multi NW process S14 of FIG. 3 will be described with reference to FIG. 4. In S30, a first determination unit 42 determines whether the normal Wi-Fi NW to which the MFP 10 currently belongs is an EPNW or a PSNW. Specifically, in the case where network type information indicating the EPNW is being stored in the memory 34, the first determination unit 42 determines that the normal Wi-Fi NW of the MFP 10 is the EPNW (i.e., YES in S30), and the process proceeds to S32. On the other hand, in the case where network type information indicating the PSNW is being stored in the memory 34, the first determination unit 42 determines that the normal Wi-Fi NW of the MFP 10 is the PSNW (i.e., NO in S30), and the process proceeds to S42.

In S32 a second determination unit 44 determines whether the WFDNW to which the MFP 10 currently belongs and the WFDNW to which the portable terminal 50 currently belongs are identical. Specifically, in the case where the received NFC information (i.e., the NFC information received in S10 of FIG. 3) includes information indicating the WFDNW, the second determination unit 44 first determines whether the SSID included in the NFC information and the SSID included in the WSI of WFDNW within the memory 34 are identical. In the case where the two SSIDs are identical, the second determination unit 44 further determines whether the BSSID included in the NFC information and the BSSID included in the WSI of WFDNW within the memory 34 are identical. In the case where the two BSSIDs are identical, the second determination unit 44 determines that the WFDNW of the MFP 10 and the WFDNW of the portable terminal 50 are the same (i.e., YES in S32), and the process proceeds to S34.

On the other hand, in the case where the two SSIDs are not identical, or in the ease where the two BSSIDs are not identical, the second determination unit 44 determines that the WFDNW of the MFP 10 and the WFDNW of the portable terminal 50 are different (i.e., NO in S32), and the process proceeds to S36. Further, in the case where the received NFC information includes information indicating no NW, information indicating the EPNW, or information indicating the PSNW, the second determination unit 44 determines that the WFDNW of the MFP 10 and the WFDNW of the portable terminal 50 are different (i.e., NO in S32) without executing the determination of whether the SSIDs are identical or the determination of whether the BSSIDs are identical, and the process proceeds to S36.

As described above, in S32 the second determination unit 44 executes both the determination of whether the SSIDs are identical and the determination of whether the BSSIDs are identical. That is, in the present embodiment, two wireless networks in which only the SSIDs are identical (here, the WFDNW), or two wireless networks in which only the BSSIDs are identical, are not treated as the same wireless network, and two wireless networks in which both the SSIDs and BSSIDs are identical are treated as the same wireless network. However, in a variant, in S32 the second determination unit 44 may execute only the determination of whether the SSIDs are identical, or may execute only the determination of whether the BSSIDs are identical. That is, two wireless networks in which only the SSIDs are identical, or two wireless networks in which only the BSSIDs are identical, may be treated as the same wireless network.

In S34 a process executing unit 48 sends NW change unnecessary information to the portable terminal 50 via the NFC I/F 22 (i.e., executes NFC communication) so that the state of the portable terminal 50 belonging to the WFDNW is maintained. That is, since the MFP 10 and the portable terminal 50 belong to the same wireless network (i.e., the same WFDNW), in S34 the process executing unit 48 sends the NW change unnecessary information to the portable terminal 50 without sending the WSI of WFDNW of the MFP 10 to the portable terminal 50, as in S38 or S40 (to be described). Thereby, the portable terminal 50 does not need to execute the processes for newly participating in a wireless network, and consequently the processing load of the portable terminal 50 can be reduced. Further, since the MFP 10 and the portable terminal 50 belong to the same WFDNW, the WFD communication of object data can be executed by using the WFDNW.

In S36 the process executing unit 48 determines whether the MFP 10 is in the G/O status or the client status. Specifically, in the case where the WFD status value within the memory 34 indicates the G/O status, the process executing unit 48 determines that the MFP 10 is in the G/O status (i.e., YES in S36), and the process proceeds to S38. On the other hand, in the case where the WFD status value within the memory 34 indicates the client status, the process executing unit 48 determines that the MFP 10 is in the client status (i.e., NO in S36), and the process proceeds to S40.

In S38 and S40, the process executing unit 48 sends the WSI of WFDNW within the memory 34 to the portable terminal 50 by using the NFC I/F 22 (i.e., executes NFC communication). In the situation executed in S38, the MFP 10 is operating in the G/O status and belongs to a WFDNW, and consequently the WSI of WFDNW within the memory 34 was prepared by the MFP 10 when the MFP 10 formed the WFDNW. Consequently, in S38 the process executing unit 48 sends the WSI of WFDNW prepared by the MFP 10 to the portable terminal 50. On the other hand, in the situation executed in S40, the MFP 10 is operating in the client status and belongs to a WFDNW, and consequently the WSI of WFDNW within the memory 34 was prepared by a G/O apparatus that is different from the MFP 10 when that G/O apparatus formed the WFDNW. Consequently, in S40 the process executing unit 48 sends the WSI of WFDNW prepared by that G/O apparatus to the portable terminal 50.

Moreover, when S38 or S40 is executed, the portable terminal 50 executes NFC communication, and receives the WSI of WFDNW from the MFP 10. In this case, the portable terminal 50 newly participates in the WFDNW to which the MFP 10 belongs by using the received WSI of the WFDNW. Specifically, e.g., in the case where the portable terminal 50 currently belongs to any wireless network (PSNW, EPNW, or WFDNW), the portable terminal 50 first leaves that wireless network. Next, the portable terminal 50 sends the WSI of WFDNW to the G/O apparatus of the WFDNW to which the MFP 10 belongs (i.e., to the MFP 10 (in the case where S38 is executed), or to the G/O apparatus that is different from the MFP 10 (in the ease where S40 is executed)). Thereby, the G/O apparatus of the WFDNW executes authentication of the portable terminal 50 by using the WSI of WFDNW received from the portable terminal 50 and, when the authentication of the portable terminal 50 succeeds, allows the portable terminal 50 to participate in the WFDNW (e.g., adds the identification information of the portable terminal 50 to the administration list).

Consequently, e.g., in the case where S38 was executed, the MFP 10 that is in the G/O status and the portable terminal 50 that is in the client status can execute the wireless communication of object data by executing WFD communication directly. Further, e.g., in the ease where S40 was executed, the MFP 10 that is in the client status and the portable terminal 50 that is in the client status can execute the wireless communication of object data by executing WFD communication indirectly via the G/O apparatus that is different from the MFP 10 and the portable terminal 50.

As described above, in the present embodiment, in the case where the MFP 10 currently belongs to both an EPNW and a WFDNW (YES in S30), the MFP 10 causes the portable terminal 50 to participate in the WFDNW without causing the portable terminal 50 to participate in the EPNW (S38 or S40). Thereby, e.g., the portable terminal 50 need not be made to participate in an EPNW formed within a company when the portable terminal 50 is carried by a third party who is not an employee of that company. Consequently, the security of the EPNW can be ensured. Moreover, by using the WFDNW, the MFP 10 and the portable terminal 50 can appropriately execute the WFD communication of object data.

In S42 a third determination unit 46 first determines whether the WFDNW to which the MFP 10 currently belongs and the WFDNW to which the portable terminal 50 currently belongs are the same. This determination method is the same as the determination method of S32. In the case of determining that the WFDNW of the MFP 10 and the WFDNW of the portable terminal 50 are the same (i.e., YES in S42), the process proceeds to S44.

On the other hand, in the case of determining that the WFDNW of the MFP 10 and the WFDNW of the portable terminal 50 are different, the third determination unit 46 further determines whether the PSNW to which the MFP 10 currently belongs and the PSNW to which the portable terminal 50 currently belongs are the same. Specifically, in the case where the received NFC information includes information indicating the PSNW, the third determination unit 46 executes both the determination of whether the SSIDs are identical and the determination of whether the BSSIDs are identical, as with S32. Moreover, in S32, the determination target is the SSID and BSSID included in the WSI of WFDNW within the memory 34 whereas, in S42, the determination target is the SSID and BSSID included in the WSI of PSNW within the memory 34. In the case of determining that the PSNW of the MFP 10 and the PSNW of the portable terminal 50 are the same (i.e., YES in S42), the process proceeds to S44. On the other hand, in the case of determining that the PSNW of the MFP 10 and the PSNW of the portable terminal 50 are different (i.e., NO in S42), the process proceeds to S46.

As described above, in S42, as with S32, the third determination unit 46 executes both the determination of whether the SSIDs are identical and the determination of whether the BSSIDs are identical. However, in a variant, in S42 the third determination unit 46 may execute only the determination of whether the SSIDs are identical, or may execute only the determination of whether the BSSIDs are identical.

In S44 the process executing unit 48 sends the NW change unnecessary information to the portable terminal 50 by using the NFC I/F 22 (i.e., executes NFC communication) so that the state of the portable terminal 50 belonging to the WFDNW or the PSNW is maintained. That is, since the MFP 10 and the portable terminal 50 belong to the same wireless network (i.e., the same WFDNW or PSNW), in S44 the process executing unit 48 sends the NW change unnecessary information to the portable terminal 50 without sending the wireless setting information of the wireless network to which the MFP 10 belongs (i.e., the WSI of WFDNW or the WSI of PSNW) to the portable terminal 50, as in S50, S52, or S54 (to be described). Thereby, the portable terminal 50 does not need to execute the processes for newly participating in a wireless network, and consequently the processing load of the portable terminal 50 can be reduced. Further, since the MFP 10 and the portable terminal 50 belong to the same wireless network, the wireless communication of object data can be executed by using that wireless network.

In S46 the process executing unit 48 determines whether the portable terminal 50 currently belongs to a wireless network. Specifically, in the case where the received NFC information includes information indicating EPNW, information indicating PSNW, or information indicating WFDNW, the process executing unit 48 determines that the portable terminal 50 currently belongs to a wireless network (i.e., YES in S46), and the process proceeds to S48. On the other hand, in the case where the received NFC information includes information indicating no NW, the process executing unit 48 determines that the portable terminal 50 does not currently belong to a wireless network (i.e., NO in S46), and the process proceeds to S54.

In S48 the process executing unit 48 determines whether the MFP 10 is in the G/O status or in the client status, as with S36. In the case of determining that the MFP 10 is in the G/O status (i.e., YES in S48), the process proceeds to S50. In the case of determining that the MFP 10 is in the client status (i.e., NO in S48), the process proceeds to S52.

In S50 and S52 the process executing unit 48 sends the WSI of WFDNW within the memory 34 to the portable terminal 50 by using the NFC I/F 22 (i.e., executes NFC communication), as in S38 and S40. In S50 the process executing unit 48 sends the WSI of WFDNW prepared by the MFP 10 to the portable terminal 50. In S52 the process executing unit 48 sends the WSI of WFDNW prepared by the G/O apparatus that is different from the MFP 10 to the portable terminal 50.

Moreover, when S50 or S52 is executed, as with the case where S38 and S40 are executed, the portable terminal 50 leaves the wireless network to which the portable terminal 50 belongs (the PSNW, EPNW, or WFDNW), and then newly participates in the WFDNW to which the MFP 10 belongs. Consequently, the MFP 10 and the portable terminal 50 can execute the wireless communication of object data by executing WFD communication directly or indirectly.

In S54 the process executing unit 48 sends the WSI of PSNW within the memory 34 to the portable terminal 50 by using the NFC I/F 22 (i.e., executes NFC communication). When S54 is executed, the portable terminal 50 executes NFC communication, and receives the WSI of PSNW from the MFP 10. In this case, the portable terminal 50 newly participates in the PSNW to which the MFP 10 belongs by using the received WSI of PSNW. Specifically, the portable terminal 50 sends the WSI of PSNW to the AP 60 of the PSNW to which the MFP 10 belongs. Thereby, the AP 60 executes authentication of the portable terminal 50 by using the WSI of PSNW and, when the authentication of the portable terminal 50 succeeds, allows the portable terminal 50 to participate in the PSNW. Consequently, the MFP 10 and the portable terminal 50 can execute the wireless communication of object data by executing normal Wi-Fi communication indirectly via the AP 60 that is different from the MFP 10 and the portable terminal 50.

When S34, S38, S40, S44, S50, S52, or S54 ends, the multi NW process of FIG. 4 ends.

As described above, in the present embodiment, in the case where the MFP 10 currently belongs to both a PSNW and a WFDNW (NO in S30), in the case where the portable terminal 50 does not currently belong to a wireless network (NO in S46), the MFP 10 causes the portable terminal 50 to participate in the PSNW (S54). For example, in a situation where the user of the MFP 10 and the user of the portable terminal 50 are the same, the user may wish to cause the portable terminal 50 to participate in a PSNW which remains formed constantly in the home (i.e., the PSNW to which the MFP 10 belongs). In view of such a possibility, in the present embodiment, in S54 the MFP 10 causes the portable terminal 50 to participate in the PSNW, which is a wireless network that is to remain formed constantly. Thereby, the portable terminal 50 can execute the normal Wi-Fi communication of object data with the MFP 10 by using the PSNW. Further, thereafter, the portable terminal 50 can maintain the state of belonging to the PSNW, and consequently can execute normal Wi-Fi communication with the devices belonging to the PSNW (e.g., the MFP 10, the PC 80, etc.). That is, by sending a print instruction, scan instruction, etc. to the MFP 10 by using the NFC communication, the portable terminal 50 can easily participate in, e.g., the PSNW that remains formed constantly in the home.

Further, in the present embodiment, in the case where the MFP 10 currently belongs to both a PSNW and a WFDNW (NO in S30), in the case where the portable terminal 50 currently belongs to a wireless network (YES in S46), the MFP 10 causes the portable terminal 50 to participate in the WFDNW without causing the portable terminal 50 to participate in the PSNW (S50 or S52). For example, in a situation where the portable terminal 50 currently belongs to a wireless network, it is probable that the user of the portable terminal 50 will wish to maintain the state of the portable terminal 50 participating in the existing wireless network. In view of such a possibility, in the present embodiment, in S50 or S52 the MFP 10 causes the portable terminal 50 to participate not in the PSNW, which is a wireless network that is to remain formed constantly, but in the WFDNW, which is a wireless network that is to be formed temporarily. Thereby, the portable terminal 50 can execute the WFD communication of object data with the MFP 10 by using the WFDNW. Moreover, when the communication of the object data ends, the portable terminal 50 may re-participate in the existing wireless network instead of the WFDNW.

(Non-Multi NW Process; FIG. 5)

The contents of the non-multi NW process of S16 of FIG. 3 will be described with reference to FIG. 5. In a situation where the non-multi NW process is executed, the MFP 10 belongs to only a normal Wi-Fi NW, belongs to only a WFDNW, or does not belong to any wireless network.

In S70 the control unit 30 determines whether the MFP 10 currently belongs to a normal Wi-Fi NW. Specifically, in the case where the normal Wi-Fi NW belonging information is being stored in the memory 34, the control unit 30 determines that the MFP 10 currently belongs to a normal Wi-Fi NW (YES in S70), and the process proceeds to S72. On the other hand, in the case where the normal Wi-Fi NW belonging information is not being stored in the memory 34, the control unit 30 determines that the MFP 10 does not currently belong to a normal Wi-Fi NW (NO in S70), and the process proceeds to S86.

In S72, as with S30 of FIG. 4, the control unit 30 determines whether the normal Wi-Fi NW to which the MFP 10 currently belongs is an EPNW or a PSNW. In the case of determining that the normal Wi-Fi NW of the MFP 10 is an EPNW (YES in S72), the process proceeds to S74 and S76, and in the case of determining that the normal Wi-Fi NW of the MFP 10 is a PSNW (NO in S72), the process proceeds to S78.

In S74 the control unit 30 causes the MFP 10 to change into spontaneous G/O mode. As described above, when a WFDNW is to be newly formed, normally G/O negotiation is executed and the G/O apparatus and the client apparatus are determined. By contrast, in spontaneous G/O mode it is determined, without executing G/O negotiation, that the MFP 10 assumes the G/O status. At the stage of S74, the MFP 10 is the G/O apparatus, but a client apparatus does not exist. However, one could say that, when S74 is executed, a WFDNW is formed to which only the G/O apparatus (i.e., the MFP 10) belongs. The spontaneous G/O mode is a mode which maintains the operation of the MFP 10 in the G/O status. For example, in the case where the MFP 10 assumed the G/O status in the G/O negotiation and formed a WFDNW, the MFP 10 changes from the G/O status to the device status when a client apparatus leaves that WFDNW (i.e., the WFDNW disappears). By contrast, e.g., in the case where the MFP 10 assumed the G/O status in the spontaneous G/O mode and formed a WFDNW, the MFP 10 maintains the G/O status even if a client apparatus leaves (i.e., the WFDNW is maintained).

In S74 the control unit 30 further prepares the WSI of WFDNW (authentication scheme, encryption scheme, password, SSID, BSSID, etc.). Moreover, the method of the control unit 30 preparing the WSI of WFDNW is the same as described above. In S74 the control unit 30 further stores, in the memory 34, the WFDNW belonging information, the WFD status value indicating G/O status, and the WSI of WFDNW.

In S76 the control unit 30 sends the WSI of WFDNW to the portable terminal 50, as in S38 and S50 of FIG. 4. The WSI of the WFDNW sent in S76 is the WSI of WFDNW prepared by the MFP 10 in S74. When S76 is executed, the portable terminal 50 can newly participate in the WFDNW to which the MFP 10 currently belongs. Thereby, the MFP 10 that is in the G/O status and the portable terminal 50 that is in the client status can execute the wireless communication of object data by executing WFD communication directly.

As described above, in the present embodiment, in the case where the MFP 10 currently belongs to only an EPNW (YES in S72), the MFP 10 causes the portable terminal 50 to participate in a WFDNW without causing the portable terminal 50 to participate in the EPNW (S74 and S76). Thereby, the security of the EPNW can be ensured. Further, the MFP 10 and the portable terminal 50 can appropriately execute the WFD communication of object data by using the WFDNW.

In S78, as in S42 of FIG. 4, the control unit 30 determines whether a PSNW to which the MFP 10 currently belongs and a PSNW to which the portable terminal 50 currently belongs are the same. In the case of determining that the PSNW of the MFP 10 and the PSNW of the portable terminal 50 are the same (i.e., YES in S78), the process proceeds to S80. On the other hand, in the case of determining that the PSNW of the MFP 10 and the PSNW of the portable terminal 50 are different (i.e., NO in S78), the process proceeds to S82.

S80 is the same as S34 and S44 of FIG. 4. Since the MFP 10 and the portable terminal 50 belong to the same PSNW, the wireless communication of object data can be executed by using that PSNW.

In S82, as in S46 of FIG. 4, the control unit 30 determines whether the portable terminal 50 currently belongs to a wireless network. In the case of determining that the portable terminal 50 currently belongs to a wireless network (i.e., YES in S82), the process proceeds to S74 and S76. On the other hand, in the case of determining that the portable terminal 50 does not currently belong to a wireless network (i.e., NO in S82), the process proceeds to S84.

S84 is the same as S54 of FIG. 4. When S84 is executed, the portable terminal 50 newly participates in the PSNW to which the MFP 10 belongs. Consequently, the MFP 10 and the portable terminal 50 can execute the wireless communication of object data by executing normal Wi-Fi communication indirectly via the AP 60.

As described above, in the present embodiment, in the case where the MFP 10 currently belongs to only a PSNW (NO in S72), in the case where the portable terminal 50 does not currently belong to a wireless network (NO in S82), the MFP 10 causes the portable terminal 50 to participate in the PSNW (S84). Thereby, the portable terminal 50 can easily be caused to participate in e.g., a PSNW that remains formed constantly in the home. Further, in the present embodiment, in the case where the MFP 10 currently belongs to only a PSNW (NO in S72), in the case where the portable terminal 50 currently belongs to another different wireless network (YES in S82), the MFP 10 causes the portable terminal 50 to participate in a WFDNW without causing the portable terminal 50 to participate in the PSNW (S74 and S76). By using the WFDNW, the MFP 10 and the portable terminal 50 can appropriately execute the WFD communication of object data. Further, when the communication of the object data ends, the user of the portable terminal 50 can cause the portable terminal 50 to re-participate in the existing wireless network instead of the WFDNW.

In S86 the control unit 30 determines whether the MFP 10 currently belongs to a WFDNW. Specifically, in the case where WFDNW belonging information is being stored in the memory 34, the control unit 30 determines that the MFP 10 currently belongs to a WFDNW (YES in S86), and the process proceeds to S88. On the other hand, in the case where WFDNW belonging information is not being stored in the memory 34, the control unit 30 determines that the MFP 10 does not currently belong to a WFDNW (NO in S86; i.e., the MFP 10 does not belong to any wireless network), and the process proceeds to S74 and S76. Consequently, the MFP 10 and the portable terminal 50 can appropriately execute the WFD communication of object data by using the WFDNW.

In S88, as in S32 and S42 of FIG. 4, the control unit 30 determines whether the WFDNW to which the MFP 10 currently belongs and the WFDNW to which the portable terminal 50 currently belongs are the same. In the case of determining that the WFDNW of the MFP 10 and the WFDNW of the portable terminal 50 are the same (i.e., YES in S88), the process proceeds to S90. On the other hand, in the case of determining that the WFDNW of the MFP 10 and the WFDNW of the portable terminal 50 are different (i.e., NO in S88), the process proceeds to S92.

S90 is the same as S34 and S44 of FIG. 4. Since the MFP 10 and the portable terminal 50 belong to the same WFDNW, the wireless communication of object data can be executed by using that WFDNW.

S92, S94, S96 are the same as S48, S50, S52 of FIG. 4, When S94 or S96 is executed, the portable terminal 50 newly participates in the WFDNW to which the MFP 10 belongs. Consequently, the MFP 10 and the portable terminal 50 can execute the wireless communication of object data by executing WFD communication directly or indirectly.

When S76, S80, S84, S90, S94, or S96 ends, the non-multi NW process of FIG. 5 ends.

As described above, when the multi NW process of S14 of FIG. 3 or the non-multi NW process of S16 ends, the MFP 10 and the portable terminal 50 can execute the wireless communication of object data directly or indirectly by executing either WFD communication or normal Wi-Fi wireless communication. In S18 the control unit 30 executes a print process or scan process in accordance with the instruction included in the received NFC information.

Specifically, in the case where the instruction included in the received NFC information is the print instruction, in S18 the control unit 30 receives print data (i.e., object data) from the portable terminal 50 by using the wireless LAN I/F 16.

Next, the control unit 30 supplies the print data to the print performing unit 18. Thereby, the print performing unit 18 prints an image represented by the print data on a print medium. Further, in the case where the instruction included in the received NFC information is the scan instruction, in S18 the control unit 30 activates the scan performing unit 20. Thereby, the scan performing unit 20 scans a document, creating scan data. Next, the control unit 30 sends the scan data object data) to the portable terminal 50 by using the wireless LAN I/F 16.

The print data or scan data has a larger data size than the information sent to the portable terminal 50 in the processes of FIG. 4 or FIG. 5 (e.g., the NW change unnecessary information, the WSI of WFDNW, the WSI of PSNW). As described above, the communication speed of NFC communication is slower than the communication speed of WFD communication or normal Wi-Fi communication. Consequently, if a configuration were adopted in which the wireless communication of object data between the MFP 10 and the portable terminal 50 were executed by using the NFC communication, a long time would be required for the wireless communication of object data. In view of such circumstances, in the present embodiment, in the processes of FIG. 4 or FIG. 5 the MFP 10 sends the information for executing the wireless communication of object data to the portable terminal 50 by using the wireless LAN I/F 16. Thereby, the MFP 10 and the portable terminal 50 can execute the WFD communication or normal Wi-Fi communication of object data by using the wireless LAN I/F 16, and consequently the wireless communication of object data can be executed rapidly.

(Specific Examples)

Next, specific cases realized by the processes of FIG. 3 to FIG. 5 will be described with reference to FIG. 6 to FIG. 20. FIG. 6, FIG. 9, FIG. 11, FIG. 15, and FIG. 17 to FIG. 20 show tables representing the contents of processes executed by the MFP 10 in accordance with the combinations of the status of the MFP 10 and the status of the portable terminal 50. In the column "normal Wi-Fi" in the tables, "x" indicates that the portable terminal 50 does not belong to a normal Wi-Fi NW, "EPNW" indicates that the portable terminal 50 belongs to an EPNW, and "PSNW" indicates that the portable terminal 50 belongs to a PSNW. Further, in the column "WFD" in the tables, "x" indicates that the portable terminal 50 does not belong to a WFDNW, "G/O" indicates that the portable terminal 50 is operating the G/O status and belongs to a WFDNW, and "client" indicates that the portable terminal 50 is operating in the client status and belongs to a WFDNW. Further, FIG. 7, FIG. 8, FIG. 10, FIG. 12 to FIG. 14, and FIG. 16 show sequence views of processes executed by the MFP 10 and the portable terminal 50. In these sequence views, the single line arrow between the MFP 10 and the portable terminal 50 indicates NFC communication using the NFC I/F 22, and the double line arrow between the MFP 10 and the portable terminal 50 indicates WFD communication using the wireless LAN I/F 16, or normal Wi-Fi communication.

Figure 7:
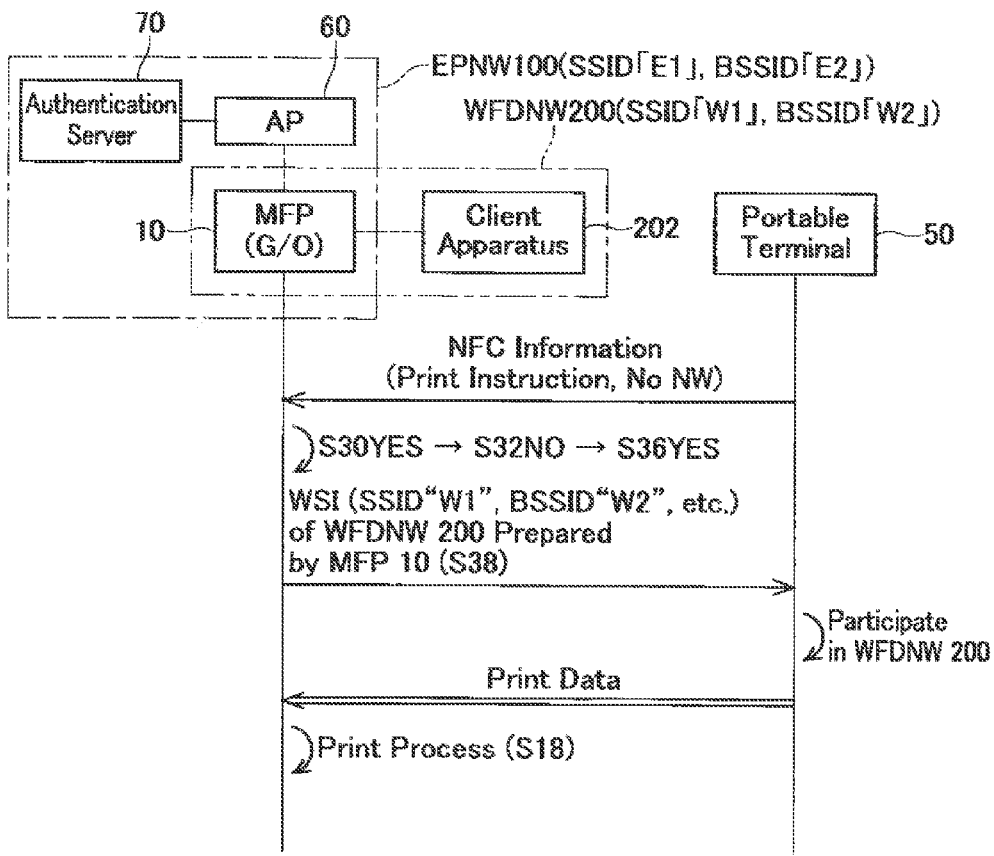
FIG. 7 shows a sequence view of case A1, in which the MFP belongs to the EPNW and the WFDNW.

(Case A; FIG. 6 to FIG. 8)

Case A will be described, in which the MFP 10 belongs to an EPNW 100 and also belongs to a WFDNW 200, in which it is operating in the G/O status. Case A is classified into the following cases (case A1, A2, etc.) in accordance with the status of the portable terminal 50.

(Case A1; FIG. 7)

In case A1 of FIG. 7, the portable terminal 50 does not belong to any wireless network. The MFP 10 executes NFC communication, and receives NFC information including a print instruction and information indicating no NW from the portable terminal 50 (YES in S10 of FIG. 3). In this case, the MFP 10 determines YES in S30 of the multi NW process of FIG. 4, determines NO in S32, and determines YES in S36. Consequently, the MFP 10 executes NFC communication, and sends the WSI of the WFDNW 200 prepared by the MFP 10 to the portable terminal 50 (S38). The portable terminal 50 participates in the WFDNW 200 by using the WSI of the WFDNW 200. The MFP 10 receives print data directly from the portable terminal 50 by using the WFDNW 200, and supplies the print data to the print performing unit 18 (S18).

As shown in case A1, in the case where the MFP 10 currently belongs to both the EPNW 100 and the WFDNW 200, the MFP 10 causes the portable terminal 50 to participate in the WFDNW 200 without causing the portable terminal 50 to participate in the EPNW 100. Thereby, the security of the EPNW 100 can be ensured. Further, the MFP 10 and the portable terminal 50 can appropriately execute the WFD communication of object data by using the WFDNW 200.

As shown in FIG. 6, in case A2, A3, A4, or A5 (2), the MFP 10 determines YES in S30 of FIG. 4, determines NO in S32, determines YES in S36, and sends the WSI of the WFDNW 200 prepared by the MFP 10 to the portable terminal 50 (S38). In any of these cases, the security of the EPNW 100 can be ensured. Further, the portable terminal 50 can leave the existing wireless network (e.g., the EPNW in case A2) and participate in the WFDNW 200. Thereby, the MFP 10 and the portable terminal 50 can appropriately execute the WFD communication of object data by using the WFDNW 200.

Moreover, in case A2, A3, or A5 (2), when the communication of object data ends, the user of the portable terminal 50 can cause the portable terminal 50 to re-participate in the existing wireless network. However, in case A4, when the portable terminal 50 that is in the G/O status leaves the existing wireless network (i.e., the WFDNW), the existing wireless network disappears. Consequently, when the communication of the object data ends, the user of the portable terminal 50 preferably causes the portable terminal 50 to re-form a WFDNW like the existing wireless network.

(Case A5 (1); FIG. 8)

In case A5 (1) of FIG. 8, the WFDNW 200 of the MFP 10 and the WFDNW 200 of the portable terminal 50 are the same. The MFP 10 executes NFC communication, receiving NFC information, from the portable terminal 50, that includes a print instruction, information indicating that the MFP 10 belongs to a WFDNW, the SSID "W1" and the BSSID "W2" (YES in S10 of FIG. 3). In this case, the MFP 10 determines YES in S30 of the multi NW process of FIG. 4, and determines YES in S32. Consequently, the MFP 10 executes NFC communication, sending the NW change unnecessary information to the portable terminal 50 (S34), By using the WFDNW 200, the MFP 10 receives print data directly from the portable terminal 50, and supplies the print data to the print performing unit 18 (S18).

As shown in case A5 (1), in the ease where the WFDNW 200 of the MFP 10 and the WFDNW of the portable terminal 50 are the same, the MFP 10 sends the NW change unnecessary information to the portable terminal 50. Thereby, the portable terminal 50 does not need to execute the processes for newly participating in a wireless network, and consequently the processing load of the portable terminal 50 can be reduced. Below, also, the same results can be obtained in the cases in which the NW change unnecessary information is sent (e.g., case B4 (1), etc.).

As shown in cases A1, A5 (1) of FIG. 7 and FIG. 8, the MFP 10 can appropriately select whether to send the WSI of WFDNW of the MFP 10 to the portable terminal 50 in accordance with whether the WFDNW of the MFP 10 and the WFDNW of the portable terminal 50 are the same.

Figure 10:
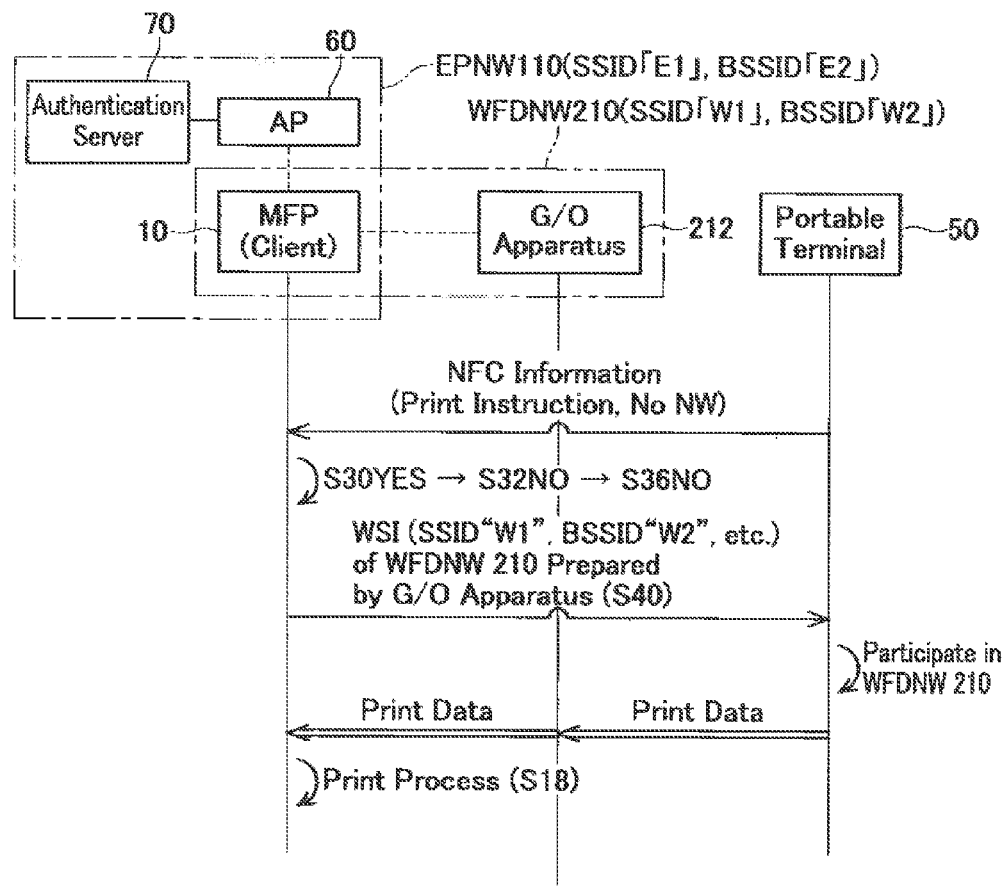
FIG. 10 shows a sequence view of case B1, in which the MFP belongs to the EPNW and the WFDNW.

(Case B; FIG. 9, FIG. 10)

Next, a case B will be described in which the MFP 10 belongs to an EPNW 110, and also belongs to a WFDNW 210, in which it is operating in the client status. Case B is classified into the following cases (case B1, B2, etc.) in accordance with the status of the portable terminal 50.

(Case B1; FIG. 10)

In case B1 of FIG. 10, the portable terminal 50 does not belong to any wireless network. The MFP 10 executes NFC communication, receiving NFC information, from the portable terminal 50, that includes a print instruction, and information indicating no NW (YES in S10 of FIG. 3). In this case, the MFP 10 determines YES in S30 of the multi NW process of FIG. 4, determines NO in S32, and determines NO in S36. Consequently, the MFP 10 executes NFC communication, sending the WSI of the WFDNW 210 prepared by a G/O apparatus 212 to the portable terminal 50 (S40). The portable terminal 50 participates in the WFDNW 210 by using the WSI of the WFDNW 210. The portable terminal 50 sends print data to the G/O apparatus 212. The G/O apparatus 212 transfers the print data to the MFP 10. The MFP 10 receives the print data from the portable terminal 50 indirectly, via the G/O apparatus 212, and supplies the print data to the print performing unit 18 (S18). Case B1 can obtain the same results as case A1 (see FIG. 7).

Moreover, as shown in FIG. 9, in case B2, B3, B4 (2), or B5 (2), the MFP 10 determines YES in S30 of FIG. 4, determines NO in S32, determines NO in S36, and sends the WSI of the WFDNW 210 prepared by the G/O apparatus 212 to the portable terminal 50 (S40). Cases B2, etc. can obtain the same results as cases A2, etc. (see FIG. 6). Further, in case B4 (1), or B5 (1), the MFP 10 determines YES in S30 of FIG. 4, determines YES in S32, and sends the NW change unnecessary information to the portable terminal 50 (S34).

(Case C; FIG. 11 to FIG. 14)

Next, a case C will be described in which the MFP 10 belongs to a PSNW 120, and also belongs to a WFDNW 220, in which it is operating in the G/O status. Case C is classified into the following cases (case C1, C2, etc.) in accordance with the status of the portable terminal 50.

Figure 12:
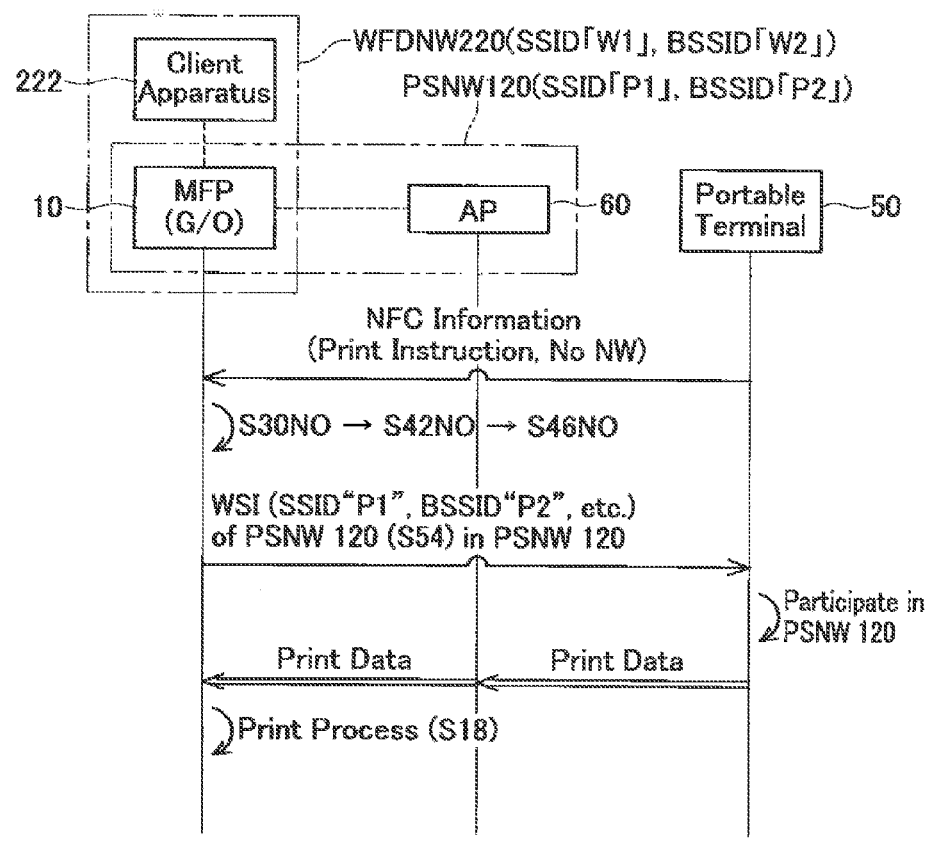
FIG. 12 shows a sequence view of case C1, in which the MFP belongs to the PSNW and the WFDNW.

(Case C1; FIG. 12)

In case C1 of FIG. 12, the portable terminal 50 does not belong to any wireless network. The MFP 10 executes NFC communication, receiving NFC information, from the portable terminal 50, that includes a print instruction and information indicating no NW (YES in S10 of FIG. 3). In this case, the MFP 10 determines NO in S30 of the multi NW process of FIG. 4, determines NO in S42, and determines NO in S46. Consequently, the MFP 10 executes NFC communication, sending the WSI of the PSNW 120 to the portable terminal 50 (S54). The portable terminal 50 participates in the PSNW 120 by using the WSI of the PSNW 120. The portable terminal 50 sends print data to the AP 60. The AP 60 transfers the print data to the MFP 10. The MFP 10 receives the print data from the portable terminal 50 indirectly via the AP 60, and supplies the print data to the print performing unit 18 (S18).

As shown in case C1, in the case where the MFP 10 currently belongs to both the PSNW 120 and the WFDNW 220, in the case where the portable terminal 50 does not belong to any wireless network, the MFP 10 causes the portable terminal 50 to participate in the PSNW 120. Thereby, the MFP 10 and the portable terminal 50 can execute the normal Wi-Fi communication of object data by using the PSNW 120. Thereafter, the portable terminal 50 can maintain the state of belonging to the PSNW 120. That is, by sending a print instruction, scan instruction, etc. to the MFP 10 by using the NFC communication, the portable terminal 50 can easily participate in, e.g., the PSNW 120 that remains formed constantly in the home.

(Case C2; FIG. 13)

In ease C2 of FIG. 13, the portable terminal 50 belongs to an EPNW 300 including an AP 160 and an authentication server 170. The MFP 10 executes NFC communication, receiving NFC information, from the portable terminal 50, that includes a print instruction and information indicating an EPNW (YES in S10 of FIG. 3). In this case, the MFP 10 determines NO in S30 of the multi NW process of FIG. 4, determines NO in S42, determines YES in S46, and determines YES in S48. Consequently, the MFP 10 executes NFC communication, sending the WSI of the WFDNW 220 prepared by the MFP 10 to the portable terminal 50 (S50). The portable terminal 50 leaves the EPNW 300, and then participates in the WFDNW 220 by using the WSI of the WFDNW 220. By using the WFDNW 220, the MFP 10 receives print data directly from the portable terminal 50, and supplies the print data to the print performing unit 18 (S18).

As shown in case C2, in the case where the MFP 10 currently belongs to both the PSNW 120 and the WFDNW 220, in the ease where the portable terminal 50 currently belongs to the EPNW 300, the MFP 10 causes the portable terminal 50 to participate in the WFDNW 220 without causing the portable terminal 50 to participate in the PSNW 120. It is probable that the user of the portable terminal 50 will wish to maintain the state of the portable terminal 50 participating in the EPNW 300. Consequently, the portable terminal 50 is caused to participate not in the PSNW 120, which is to remain formed constantly, but in the WFDNW 220, which is to be formed temporarily. Moreover, when the communication of the object data ends, the user of the portable terminal 50 may cause the portable terminal 50 to re-participate in the EPNW 300 instead of the WFDNW 220.

(Case C3 (1); FIG. 14)

In case C3 (1) of FIG. 14, the PSNW 120 of the MFP 10 and the PSNW 120 of the portable terminal 50 are the same. The MFP 10 executes NFC communication, receiving NFC information from the portable terminal 50 that includes a print instruction, information indicating that the portable terminal 50 belongs to a PSNW, the SSID "P1" and the BSSID "P2" (YES in S10 of FIG. 3). in this case, the MFP 10 determines NO in S30 of the multi NW process of FIG. 4, and determines YES in S42. Consequently, the MFP 10 executes NFC communication, sending the NW change unnecessary information to the portable terminal 50 (S44). The portable terminal 50 sends print data to the AP 60. The AP 60 transfers the print data to the MFP 10, The MFP 10 receives the print data from the portable terminal 50 indirectly via the AP 60, and supplies the print data to the print performing unit 18 (S18).

As shown in cases C1, C3 (1) of FIG. 12 and FIG. 14, the MFP 10 can appropriately select whether to send the WSI of PSNW of the MFP 10 to the portable terminal 50 in accordance with whether the PSNW of the MFP 10 and the PSNW of the portable terminal 50 are the same. Further, as shown in cases C1, C2 of FIG. 12 and FIG. 13, the MFP 10 can appropriately select whether to send the WSI of PSNW of the MFP 10 to the portable terminal 50, or to send the WSI of WFDNW of the MFP 10 to the portable terminal 50 in accordance with the status of the portable terminal 50 (i.e., Whether the portable terminal 50 belongs to a wireless network).

As shown in FIG. 11, in case C3 (2), C4, or C5 (2), the MFP 10 determines NO in S30 of FIG. 4, determines NO in S42, determines YES in S46, determines YES in S48, and sends the WSI of the WFDNW 220 prepared by the MFP 10 to the portable terminal 50 (S50), These cases C4, etc. can obtain the same results as case C2 (see FIG. 13). Further, in case C5 (1), the MFP 10 determines NO in S30 of FIG. 4, determines YES in S42, and sends the NW change unnecessary information to the portable terminal 50 (S44).

(Case D; FIG. 15, FIG. 16)

Next, a case D will be described in which the MFP 10 belongs to a PSNW 130, and also belongs to a WFDNW 230, in which it is operating in the client status. Case D is classified into the following cases (case D1, D2, etc.) in accordance with the status of the portable terminal 50.

(Case D2; FIG. 16)

In case D2 of FIG. 16, the portable terminal 50 belongs to the EPNW 300 that includes the AP 160 and the authentication server 170. The MFP 10 executes NFC communication, receiving NFC information, from the portable terminal 50, that includes a print instruction and information indicating an EPNW (YES in S10 of FIG. 3). In this case, the MFP 10 determines NO in S30 of the multi NW process of FIG. 4, determines NO in S42, determines YES in S46, and determines NO in S48. Consequently, the MFP 10 executes NFC communication, sending the WSI of the WFDNW 230 prepared by a G/O apparatus 232 to the portable terminal 50 (S52). The portable terminal 50 leaves the EPNW 300, and then participates in the WFDNW 230 by using the WSI of the WFDNW 230. The portable terminal 50 sends print data to the G/O apparatus 232. The G/O apparatus 232 transfers the print data to the MFP 10. The MFP 10 receives the print data from the portable terminal 50 indirectly via the G/O apparatus 232, and supplies the print data to the print performing unit 18 (S18). Case D2 can obtain the same results as case C2 (see FIG. 13).

As shown in FIG. 15, in case D1 the MFP 10 determines NO in S30 of FIG. 4, determines NO in S42, determines NO in S46, and sends the WSI of the PSNW 130 to the portable terminal 50 (S54). Case D1 can obtain the same results as case C1 (see FIG. 12). Further, in case D2, D3 (2), D4 (2), or D5 (2), the MFP 10 determines NO in S30 of FIG. 4, determines NO in S42, determines YES in S46, determines NO in S48, and sends the WSI of the WFDNW 230 prepared by the G/O apparatus 232 to the portable terminal 50 (S52). These cases D2, etc. can obtain the same results as case C2 (see FIG. 13). Further, in case D3 (1), D4 (1), or D5 (1), the MFP 10 determines NO in S30 of FIG. 4, determines YES in S42, and sends the NW change unnecessary information to the portable terminal 50 (S44).

(Case E; FIG. 17)

In case E of FIG. 17, the MFP 10 belongs to only an EPNW 140. As shown in cases E1 to E5, the MFP 10 changes into spontaneous G/O mode regardless of the status of the portable terminal 50 (S74), and sends the WSI of WFDNW prepared by the MFP 10 to the portable terminal 50 (S76). That is, the MFP 10 causes the portable terminal 50 to participate in a WFDNW without causing the portable terminal 50 to participate in the EPNW 140. Thereby, the security of the EPNW 140 can be ensured. Further, the MFP 10 and the portable terminal 50 can appropriately execute the WFD communication of object data by using the WFDNW.

(Case F; FIG. 18)

In case F of FIG. 18, the MFP 10 belongs to only a PSNW 140. In case F1, the MFP 10 sends the WSI of the PSNW 150 to the portable terminal 50 (S84). That is, the MFP 10 causes the portable terminal 50 to participate in the PSNW 150. Thereby, the portable terminal 50 can easily be made to participate in, e.g., the PSNW 150 that remains formed constantly in the home. Further, in cases F2, F3 (2), F4, F5, the MFP 10 changes into spontaneous G/O mode (S74), and sends the WSI of WFDNW prepared by the MFP 10 to the portable terminal 50 (S76). That is, the MFP 10 causes the portable terminal 50 to participate in a WFDNW without causing the portable terminal 50 to participate in the PSNW 150. The MFP 10 and the portable terminal 50 can appropriately execute the WFD communication of object data by using the WFDNW. Further, when the communication of the object data ends, the user of the portable terminal 50 can cause the portable terminal 50 to re-participate in the existing wireless network instead of the WFDNW. Further, in case F3 (1), the MFP 10 sends the NW change unnecessary information to the portable terminal 50 (S80).

(Case G; FIG. 19)

In case G of FIG. 19, the MFP 10 is operating in the G/O status and belongs to only a WFDNW 240. In cases G1, G2, G3, G4, G5 (2) the MFP 10 sends the WSI of the WFDNW 240 prepared by the MFP 10 to the portable terminal 50 (S94). These cases G1, etc. can obtain the same results as cases F2, etc. (see FIG. 18). Further, in case G5 (1), the MFP 10 sends the NW change unnecessary information to the portable terminal 50 (S90).

(Case H; FIG. 20)

In case H of FIG. 20, the MFP 10 is operating in the client status and belongs to only a WFDNW 250. In cases H1, H2, H3, H4 (2), H5 (2), the MFP 10 sends the WSI of the WFDNW 250 prepared by a G/O apparatus 252 to the portable terminal 50 (S96). These cases H1, etc. can obtain the same results as cases F2, etc. (see FIG. 18). Further, in cases H4 (1), H5 (1), the MFP 10 sends the NW change unnecessary information to the portable terminal 50 (S90).

Moreover, although a table is not shown, in the case where the MFP 10 does not belong to any wireless network (NO in S86 of FIG. 5), the MFP 10 changes into spontaneous G/O mode (S74) regardless of the status of the portable terminal 50, and sends the WSI of WFDNW prepared by the MFP 10 to the portable terminal 50 (S76). Thereby, the MFP 10 and the portable terminal 50 can appropriately execute the WFD communication of object data by using the WFDNW.

(Effect of Present Embodiment)

According to the present embodiment, in the case where the MFP 10 currently belongs to both a normal Wi-Fi NW and a WFDNW, the MFP 10 determines whether the normal Wi-Fi NW is an EPNW or a PSNW (S30 of FIG. 4). In the case of determining that the normal Wi-Fi NW is an EPNW (YES in S30), the MFP 10 sends the WSI of WFDNW, for the portable terminal 50 to participate in the WFDNW, to the portable terminal 50 by using the NFC I/F 22 (S38, S40). Thereby, the portable terminal 50 can participate in the WFDNW by using the WSI of WFDNW (see case A1 of FIG. 7). Consequently, by using the WFDNW, the MFP 10 and the portable terminal 50 can appropriately execute the WFD communication of object data. Further, in the case of determining that the normal Wi-Fi NW is a PSNW (NO in S30), the MFP 10 sends the WSI of PSNW, for the portable terminal 50 to participate in the normal Wi-Fi NW (i.e., the PSNW), to the portable terminal 50 by using the NFC I/F 22 (S54). Thereby, the portable terminal 50 can participate in the PSNW by using the WSJ of PSNW (case C1 of FIG. 12). Consequently, the MFP 10 and the portable terminal 50 can appropriately execute the normal Wi-Fi communication of object data by using the PSNW. Thus, in the case where the MFP 10 currently belongs to both a normal Wi-Fi NW and a WFDNW, the MFP 10 can execute an appropriate process in accordance with whether the normal Wi-Fi NW is an EPNW or a PSNW.

(Corresponding Relationships)

The MFP 10 is an example of a "communication device". The NFC I/F 22 and the wireless LAN I/F 16 are respectively examples of the "first type of interface" and the "second type of interface". The normal Wi-Fi communication and the WFD communication are respectively examples of the "first type of wireless communication" and the "second type of wireless communication". The normal Wi-Fi NW and the WFDNW are respectively examples of the "first type of wireless network" and the "second type of wireless network". The case of YES in S30 of FIG. 4 and the case of NO in S30 are respectively examples of the "when it is determined that the first type of wireless network is the enterprise wireless network" and the "when it is deter wined that the first type of wireless network is not the enterprise wireless network". Further, the process S38 (or S40) of FIG. 4, the process S54, and the process S50 (or S52) are respectively examples of the "sending process", the "first particular process" and the "second particular process". The WSI of WFDNW sent in the process S38, S40, S50, or S52 is an example of the "first wireless setting information". The WSI of WFDNW sent in the process S38 or S50 is an example of the "first wireless setting information prepared by the communication device". The WSI of WFDNW sent in the process S40 or S52 is an example of the "first wireless setting information prepared by an apparatus different from the communication device". The WSI of PSNW sent in the process S54 is an example of the "second wireless setting information". Further, the G/O status and the client status are respectively examples of the "parent station state" and the "child station state".

Case A1 of FIG. 7 is an example of "when it is determined that the first type of wireless network is the enterprise wireless network and when the communication device currently belongs to the second type of wireless network by operating in the parent station state". Case B1 of FIG. 10 is an example of "when it is determined that the first type of wireless network is the enterprise wireless network and when the communication device currently belongs to the second type of wireless network by operating in the child station state". In this example, the G/O apparatus 212 is an example of the "apparatus different from the communication device". Case C1 of FIG. 12 is an example of "in a case where it is determined, due to a reason why the portable terminal does not currently belong to any of wireless networks, that the portable terminal does not currently belong to the first type of wireless network to which the communication device currently belongs". Case C2 of FIG. 13 is an example of "if the communication device currently belongs to the second type of wireless network by operating in the parent station state in the specific case". Further, case D2 of FIG. 16 is an example of "if the communication device currently belongs to the second type of wireless network by operating in the child station state in the specific ease". In this example, the G/O apparatus 232 is an example of the "apparatus different from the communication device".

(Variant 1)

In the case of NO in S36 and/or in the case of NO in S48 of FIG. 4, the process executing unit 48 may execute the following processes (variant 1-1) or (variant 1-2) instead of S40 and/or S52.

(Variant 1-1)

The process executing unit 48 may send error information to the portable terminal 50 by using the NFC I/F 22, this error information indicating that the MFP 10 and the portable terminal 50 are not capable of executing wireless communication via the wireless LAN I/F 16 (i.e., normal Wi-Fi communication and WFD communication). In this case, the portable terminal 50 may display the error information on a display unit of the portable terminal 50. Thereby, the user of the portable terminal 50 can learn that the wireless communication of object data cannot be executed.

(Variant 1-2)

After disconnecting the MFP 10 from the WFDNW, the process executing unit 48 may change the MFP 10 into spontaneous G/O mode, and form a new WFDNW. Thereupon, the process executing unit 48 may send the WSI of the new WFDNW to the portable terminal 50 by using the NFC I/F 22. In this case, the portable terminal 50 may participate in the new WFDNW by using the WSI of the new WFDNW. In this configuration, also, the MFP 10 and the portable terminal 50 can appropriately execute the WFD communication of object data by using the new WFDNW. Moreover, the processes of (variant 1-1) or (variant 1-2) may be executed instead of S96 of FIG. 5.

(Variant 2)

In the above embodiment, after determining that the normal Wi-Fi NW of the MFP 10 is an EPNW (YES in S30), the second determination unit 44 determines whether the WFDNW of the MFP 10 and the WFDNW of the portable terminal 50 are the same (S32). Instead, the second determination unit 44 may determine whether the WFDNW of the MFP 10 and the WFDNW of the portable terminal 50 are the same before determining whether the normal Wi-Fi NW of the MFP 10 is an EPNW. That is, the second determination unit 44 may execute the determination of S32 before executing the determination of S30. Thereupon, in the case of determining that the WFDNW of the MFP 10 and the WFDNW of the portable terminal 50 are the same, the process executing unit 48 may execute the process S34 in a state in which the determination of S30 is not executed. In general terms, the second determining may be execute after the first determining, or the second determining may be execute before the first determining. In the case of determining that the portable terminal currently belongs to the second type of wireless network, it does not need to execute the sending process.

(Variant 3)

As in variant 2 above, the third determination unit 46 may determine whether the PSNW of the MFP 10 and the PSNW of the portable terminal 50 are the same before determining whether the normal Wi-Fi NW of the MFP 10 is an EPNW. That is, the third determination unit 46 may execute the determination S42 before executing the determination S30. Thereupon, in the case of determining that the PSNW of the MFP 10 and the PSNW of the portable terminal 50 are the same, the process executing unit 48 may execute the process S44 in a state where the determination S30 is not executed. In general terms, the third determining may be executed after the first determining, or the third determining may be executed before the first determining. In the case of determining that the portable terminal currently belongs to the first type of wireless network, it does not need to execute the sending process.

(Variant 4)

The "first particular process" is not restricted to the process S54 of FIG. 4, but may be another process. For example, in the case of NO in S30, the process executing unit 48 may send the NW change unnecessary information to the portable terminal 50 by using the NFC I/F 22 without executing the processes S42 to S54. In the present variant, e.g., in the case where the PSNW of the MFP 10 and the PSNW of the portable terminal 50 are the same, the MFP 10 and the portable terminal 50 can execute the normal Wi-Fi communication of object data by using the same PSNW. In general terms, the first particular process may be any process different from the sending process.

(Variant 5)

The "second particular process" is not restricted to the process S50 or S52 of FIG. 4, but may be another process. For example, in the case of YES in S46, the process executing unit 48 may execute the error process (variant 1-1) without executing the processes S48 to S52. In the present variant, the portable terminal 50 can maintain the state of belonging to an existing wireless network (e.g., the PSNW, etc.). In general terms, the second particular process may be any process different from the first particular process.

(Variant 6)

In the above embodiment, the portable terminal 50 cannot simultaneously belong to both a WFDNW and a normal Wi-Fi NW. Instead, the portable terminal 50 may be able to simultaneously belong to both a WFDNW and a normal Wi-Fi NW. For example, in the case where the portable terminal 50 simultaneously belongs to both a WFDNW and a PSNW, NFC information sent from the portable terminal 50 to the MFP 10 may include the SSID and BSSID of the WFDNW of the portable terminal 50, and the SSID and BSSID of the PSNW of the portable terminal 50. In this case, in S32 of FIG. 4, the second determination unit 44 may execute the determination by using the SSID and BSSID of the WFDNW included in the NFC information. Further, in S42 of FIG. 4, the third determination unit 46 may execute the determination by using the SSID and BSSID of the WFDNW included in the NFC information and, further, execute the determination by using the SSID and BSSID of the PSNW included in the NFC information.

(Variant 7)

The "second type of wireless network" is not restricted to the WFDNW, but may be any kind of wireless network as long as it is a wireless network for executing the second type of wireless communication not via an access point constituted separately from the communication device and the portable terminal. For example, the MFP 10 may store an AP program for functioning as an access point. The MFP 10 may be configured such that, instead of belonging to a WFDNW, the MFP 10 belongs to a normal Wi-Fi NW that is formed in accordance with the AP program of the MFP 10. That is, the MFP 10 may belong to both a first normal Wi-Fi NW that includes the AP 60, and a second normal Wi-Fi NW formed in accordance with the AP program of the MFP 10. In the present variant, the first normal Wi-Fi NW and the second normal Wi-Fi NW are respectively examples of the "first type of wireless network" and the "second type of wireless network".

(Variant 8)

The "first type of interface" is not restricted to an interface for executing NFC communication, but may be an interface for executing infrared communication, an interface for executing Bluetooth (registered trademark), or an interface for executing Transfer Jet. In general terms, the "first type of interface" may be any interface whereby the communication speed of wireless communication via the second type of interface is faster than the communication speed of wireless communication via the first type of interface.

(Variant 9)

The "first type of interface" and the "second type of interface" may be two interfaces constituted separately (e.g., two IC chips), as in the above embodiment, or may be one interface constituted integrally (e.g., one IC chip). Further, in the above embodiment, the "second type of interface" is one interface (i.e., the wireless LAN I/F 16). Instead, the "second type of interface" may be constituted by a first interface (i.e., one IC chip) for executing the first type of wireless communication, and a second interface (i.e., one IC chip) for executing the second type of wireless communication, this second interface being constituted separately from the first interface.

(Variant 10)

In the above embodiment, in the multi NW process of FIG. 4, the second determination unit 44 executes the process S32 and the third determination unit 46 executes the process S42. Instead, in the case of YES in S30 of FIG. 4, S36 to S40 may be executed without executing S32 and S34. That is, the control unit 30 need not comprise the second determination unit 44. Further, in the case of NO in S30 of FIG. 4, S54 may be executed without executing S42 to S52. That is, the control unit 30 need not comprise the third determination unit 46. That is, the control unit 30 may comprise the receiving unit 40, the first determination unit 42 and the process executing unit 48.

(Variant 11)

The "communication device" is not restricted to the MFP 10, but may be another communication device (e.g., printer, scanner, FAX device, copier, telephone, desktop PC, notebook PC, tablet PC, server, mobile phone, PDA terminal, etc.).

(Variant 12)

In the above embodiment, the functions of the units 40 to 48 are realized by the CPU 32 of the MFP 10 executing programs (computer-readable instructions) (i.e., software) within the memory 34. Instead, at least one of the units 40 to 48 may be realized by hardware such as a logic circuit, etc.

The invention claimed is:

1. A communication device comprising:
a first type of interface configured to execute a wireless communication with a portable terminal;
a second type of interface configured to execute a wireless communication with the portable terminal, the second type of interface being different from the first type of interface, the second type of interface being an interface for executing a first type of wireless communication via an access point and a second type of wireless communication not via the access point, the access point being constituted separately from the communication device and the portable terminal; and
a processor configured to execute:
receiving specific information from the portable terminal using the first type of interface in a state where the communication device currently belongs, using the second type of interface, to both of a first type of wireless network for executing the first type of wireless communication and a second type of wireless network for executing the second type of wireless communication;
first determining whether the first type of wireless network is an enterprise wireless network or a personal wireless network when the specific information is received, the enterprise wireless network being a wireless network in accordance with an enterprise type of authentication scheme in which an authentication is performed by an authentication server different from the access point, the personal wireless network being a wireless network in accordance with a personal type of authentication scheme in which an authentication is performed by the access point;
a sending process comprising sending, under a specific condition, first wireless setting information to the portable terminal using the first type of interface when it is determined that the first type of wireless network is not the personal wireless network and is the enterprise wireless network, the first wireless setting information being information for the portable terminal to participate in the second type of wireless network; and
a first particular process comprising sending, under a specific condition, second wireless setting information to the portable terminal using the first type of interface when it is determined that the first type of wireless network is not the enterprise wireless network and is the personal wireless network, the second wireless setting information being information for the portable terminal to participate in the first type of wireless network.

2. The communication device as in claim 1, wherein
the communication device is capable of selectively operating in one of a plurality of states including a parent station state functioning as a parent station of a wireless network and a child station state functioning as a child station of the wireless network,
the communication device is capable of belonging to the second type of wireless network by operating in the parent station state or the child station state, and
when it is determined that the first type of wireless network is the enterprise wireless network and when the communication device currently belongs to the second type of wireless network by operating in the parent station state, the processor is configured to execute the sending process comprising sending the first wireless setting information, which has been prepared by the communication device when the communication device has formed the second type of wireless network, to the portable terminal using the first type of interface.

3. The communication device as in claim 2, wherein:
when it is determined that the first type of wireless network is the enterprise wireless network and when the communication device currently belongs to the second type of wireless network by operating in the child station state, the processor is configured to execute the sending process comprising sending the first wireless setting information, which has been prepared by an apparatus different from the communication device when the apparatus has formed the second type of wireless network, to the portable terminal using the first type of interface.

4. The communication device as in claim 1, wherein
the processor is configured to further execute:
   second determining whether the portable terminal currently belongs to the second type of wireless network to which the communication device currently belongs,
the processor is configured not to execute the sending process when it is determined that the portable terminal currently belongs to the second type of wireless network, and
the processor is configured to execute the sending process when it is determined that the first type of wireless network is the enterprise wireless network and when it is determined that the portable terminal does not currently belong to the second type of wireless network.

5. The communication device as in claim 4, wherein
the processor is configured to execute the second determining of whether the portable terminal currently belongs to the second type of wireless network to which the communication device currently belongs, after it is determined that the first type of wireless network is the enterprise wireless network, and
the processor is configured not to execute the sending process when it is determined that the portable terminal currently belongs to the second type of wireless network to which the communication device currently belongs.

6. The communication device as in claim 1, wherein
the processor is configured to further execute:
   third determining whether the portable terminal currently belongs to the first type of wireless network to which the communication device currently belongs,
the processor is configured not to execute the first particular process when it is determined that the portable terminal currently belongs to the first type of wireless network to which the communication device currently belongs, and
the processor is configured to execute the first particular process when it is determined that the first type of wireless network is the personal wireless network and when it is determined that the portable terminal does not currently belong to the first type of wireless network to which the communication device currently belongs.

7. The communication device as in claim 6, wherein
the processor is configured to execute the third determining of whether the portable terminal currently belongs to the first type of wireless network to which the communication device currently belongs, after it is determined that the first type of wireless network is the personal wireless network, and
the processor is configured not to execute the first particular process when it is determined that the portable terminal currently belongs to the first type of wireless network to which the communication device currently belongs.

8. The communication device as in claim 6, wherein
the processor is configured to execute:
   the first particular process in a case where it is determined, due to a reason why the portable terminal does not currently belong to any of wireless networks, that the portable terminal does not currently belong to the first type of wireless network to which the communication device currently belongs, in the case where it is determined that the first type of wireless network is the personal wireless network; and
   a second particular process different from the first particular process in a specific case where it is determined, due to a reason why the portable terminal currently belongs to a wireless network different from the first type of wireless network, that the portable terminal does not currently belong to the first type of wireless network to which the communication device currently belongs, in the case where it is determined that the first type of wireless network is the personal wireless network.

9. The communication device as in claim 8, wherein
the communication device is capable of selectively operating in one of a plurality of states including a parent station state functioning as a parent station of a wireless network and a child station state functioning as a child station of the wireless network,
the communication device is capable of belonging to the second type of wireless network by operating in the parent station state or the child station state, and
if the communication device currently belongs to the second type of wireless network by operating in the parent station state in the specific case, the processor is configured to execute the second particular process comprising sending the first wireless setting information, which has been prepared by the communication device when the communication device has formed the second type of wireless network, to the portable terminal using the first type of interface.

10. The communication device as in claim 9, wherein
if the communication device currently belongs to the second type of wireless network by operating in the child station state in the specific case, the processor is configured to execute the second particular process comprising sending the first wireless setting information, which has been prepared by an apparatus different from the communication device when the apparatus has formed the second type of wireless network, to the portable terminal using the first type of interface.

11. The communication device as in claim 1, wherein
a communication speed of the wireless communication using the second type of interface is faster than a communication speed of the wireless communication using the first type of interface.

12. A non-transitory computer-readable storage medium that stores computer-readable instructions for a communication device,
the communication device comprising:
   a first type of interface configured to execute a wireless communication with a portable terminal;
   a second type of interface configured to execute a wireless communication with the portable terminal, the second type of interface being different from the first type of interface, the second type of interface being an interface for executing a first type of wireless communication via an access point and a second type of wireless communication not via the access point, the access point being constituted separately from the communication device and the portable terminal; and
   a processor,
the computer-readable instructions, when executed by the processor, causing the communication device to execute:
   receiving specific information from the portable terminal using the first type of interface in a state where the communication device currently belongs, using the second type of interface, to both a first type of wireless network for executing the first type of wireless communication and a second type of wireless network for executing the second type of wireless communication;

first determining whether the first type of wireless network is an enterprise wireless network or a personal wireless network when the specific information is received, the enterprise wireless network being a wireless network in accordance with an enterprise type of authentication scheme in which an authentication is performed by an authentication server different from the access point, the personal wireless network being a wireless network in accordance with a personal type of authentication scheme in which an authentication is performed by the access point;

a sending process comprising sending, under a specific condition, first wireless setting information to the portable terminal using the first type of interface when it is determined that the first type of wireless network is not the personal wireless network and is the enterprise wireless network, the first wireless setting information being information for the portable terminal to participate in the second type of wireless network; and a first particular process comprising sending, under a specific condition, second wireless setting information to the portable terminal using the first type of interface when it is determined that the first type of wireless network is not the enterprise wireless network and is the personal wireless network, the second wireless setting information being information for the portable terminal to participate in the first type of wireless network.

* * * * *